JAMES E. WARD
INVENTOR.

BY Fraser and Bogucki

ATTORNEYS

INVENTOR.
JAMES E. WARD

INVENTOR.
JAMES E. WARD
BY
Fraser and Bogucki
ATTORNEYS

JAMES E. WARD
INVENTOR.

BY Fraser and Bogucki
ATTORNEYS

Jan. 11, 1966  J. E. WARD  3,229,080
DIGITAL COMPUTING SYSTEMS
Filed Oct. 19, 1962  11 Sheets-Sheet 10
FIG. 10
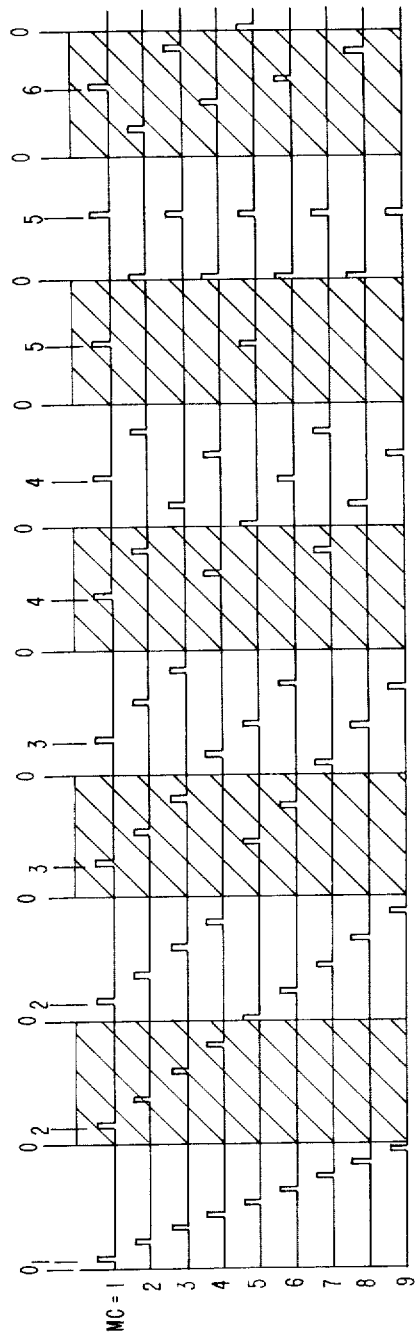
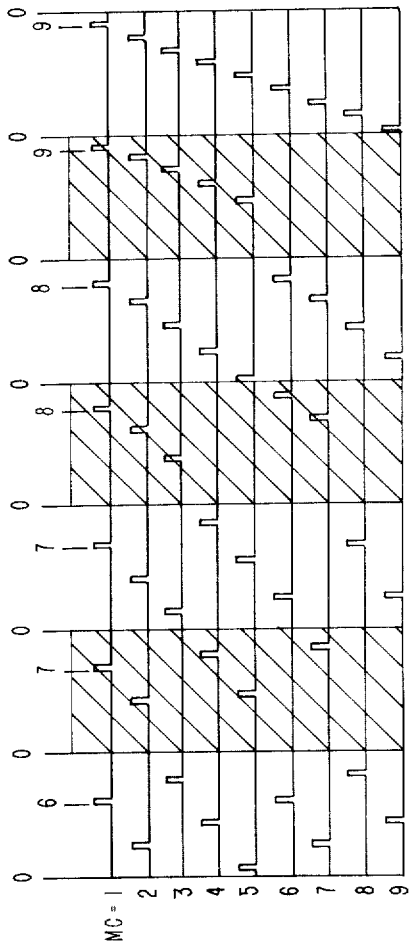
*INVENTOR.*
JAMES E. WARD
BY
ATTORNEYS Jan. 11, 1966  J. E. WARD  3,229,080
DIGITAL COMPUTING SYSTEMS
Filed Oct. 19, 1962  11 Sheets-Sheet 11

| | REGISTER | | | | | | | | | | ACCUMULATOR | | | | | | | | | |
|---|---|---|---|---|---|---|---|---|---|---|---|---|---|---|---|---|---|---|---|---|
| | 10 | 9 | 8 | 7 | 6 | 5 | 4 | 3 | 2 | 1 | 20 | 19 | 18 | 17 | 16 | 15 | 14 | 13 | 12 | |
| READ IN | 0 | 4 | 5 | | | | | | | | 0 | 4 | 1 | 7 | 7 | 8 | | | | |
| COMPLEMENT 9's | 9 | 5 | 4 | | | | | | | | | | | | | | | | | |
| COMPLEMENT 10's | 9 | 5 | 5 | | | | | | | | | | | | | | | | | |
| SUBTRACT (OVERDRAFT) | | | | | | | | | | | 9 | 9 | 6 | | | | | | | SUPPRESS CARRY INTO 20TH |
| COMPLEMENT 9's | 0 | 4 | 4 | | | | | | | | | | | | | | | | | |
| COMPLEMENT 10's | 0 | 4 | 5 | | | | | | | | | | | | | | | | | |
| ADD (CORRECTION) | | | | | | | | | | | 0 | 4 | 1 | | | | | | | |
| COMPLEMENT 9's | 9 | 5 | 4 | | | | | | | | | | | | | | | | | |
| COMPLEMENT 10's | 9 | 5 | 5 | | | | | | | | | | | | | | | | | |
| SHIFT | 0 | 9 | 5 | 5 | | | | | | | 0 | 4 | 1 | 7 | | | | | | |
| SUBTRACT | | | | | | | | | | | 1 | 3 | 7 | 2 | | | | | | |
| SUBTRACT | | | | | | | | | | | 2 | 3 | 2 | 7 | | | | | | |
| SUBTRACT | | | | | | | | | | | 3 | 2 | 8 | 2 | | | | | | |
| SUBTRACT | | | | | | | | | | | 4 | 2 | 3 | 7 | | | | | | |
| SUBTRACT | | | | | | | | | | | 5 | 2 | 9 | 2 | | | | | | |
| SUBTRACT | | | | | | | | | | | 6 | 1 | 4 | 7 | | | | | | |
| SUBTRACT | | | | | | | | | | | 7 | 1 | 0 | 2 | | | | | | |
| SUBTRACT | | | | | | | | | | | 8 | 0 | 5 | 7 | | | | | | |
| SUBTRACT | | | | | | | | | | | 9 | 0 | 6 | 7 | | | | | | |
| SUBTRACT (OVERDRAFT) | | | | | | | | | | | 9 | 9 | 6 | 7 | | | | | SUPPRESS CARRY INTO 19TH |
| COMPLEMENT 9's | | 0 | 4 | 4 | | | | | | | | | | | | | | | | |
| COMPLEMENT 10's | | 0 | 4 | 5 | | | | | | | | | | | | | | | | |
| ADD (CORRECTION) | | | | | | | | | | | 9 | 0 | 1 | 2 | | | | | | |
| COMPLEMENT 9's | | 9 | 5 | 4 | | | | | | | | | | | | | | | | |
| COMPLEMENT 10's | | 9 | 5 | 5 | | | | | | | | | | | | | | | | |
| SHIFT | | 0 | 9 | 5 | 5 | | | | | | 9 | 0 | 1 | 2 | 7 | | | | | |
| SUBTRACT | | | | | | | | | | | 9 | 1 | 0 | 8 | 2 | | | | | |
| SUBTRACT | | | | | | | | | | | 9 | 2 | 0 | 3 | 7 | | | | | |
| SUBTRACT (OVERDRAFT) | | | | | | | | | | | 9 | 2 | 9 | 9 | 2 | | | | SUPPRESS CARRY INTO 18TH |
| COMPLEMENT 9's | | | 0 | 4 | 4 | | | | | | | | | | | | | | | |
| COMPLEMENT 10's | | | 0 | 4 | 5 | | | | | | | | | | | | | | | |
| ADD (CORRECTION) | | | | | | | | | | | 9 | 2 | 0 | 3 | 7 | | | | | |
| COMPLEMENT 9's | | | 9 | 5 | 4 | | | | | | | | | | | | | | | |
| COMPLEMENT 10's | | | 9 | 5 | 5 | | | | | | | | | | | | | | | |
| SHIFT | | | 0 | 9 | 5 | 5 | | | | | 9 | 2 | 0 | 3 | 7 | 8 | | | | |
| SUBTRACT | | | | | | | | | | | 9 | 2 | 1 | 3 | 8 | 3 | | | | |
| SUBTRACT | | | | | | | | | | | 9 | 2 | 2 | 3 | 8 | 8 | | | | |
| SUBTRACT | | | | | | | | | | | 9 | 2 | 3 | 4 | 9 | 3 | | | | |
| SUBTRACT | | | | | | | | | | | 9 | 2 | 4 | 1 | 5 | 8 | | | | |
| SUBTRACT | | | | | | | | | | | 9 | 2 | 5 | 0 | 8 | 3 | | | | |
| SUBTRACT | | | | | | | | | | | 9 | 2 | 6 | 0 | 6 | 8 | | | | |
| SUBTRACT | | | | | | | | | | | 9 | 2 | 7 | 1 | 3 | 3 | | | | |
| SUBTRACT | | | | | | | | | | | 9 | 2 | 8 | 7 | 8 | 8 | | | | |
| SUBTRACT (OVERDRAFT) | | | | | | | | | | | 9 | 2 | 8 | 8 | 7 | 3 | | | | SUPPRESS CARRY INTO 17TH |
| COMPLEMENT 9's | | | | 0 | 4 | 4 | | | | | | | | | | | | | | |
| COMPLEMENT 10's | | | | 0 | 4 | 5 | | | | | | | | | | | | | | |
| ADD (CORRECTION) | | | | | | | | | | | 9 | 2 | 8 | 0 | 1 | 8 | | | | |
| COMPLEMENT 9's | | | | 9 | 5 | 4 | | | | | | | | | | | | | | |
| COMPLEMENT 10's | | | | 9 | 5 | 5 | | | | | | | | | | | | | | |
| SHIFT | | | | 0 | 9 | 5 | 5 | | | | 9 | 2 | 8 | 0 | 1 | 8 | 0 | | | |
| SUBTRACT | | | | | | | | | | | 9 | 2 | 8 | 1 | 2 | 3 | 5 | | | |
| SUBTRACT | | | | | | | | | | | 9 | 2 | 8 | 2 | 0 | 9 | 0 | | | |
| SUBTRACT | | | | | | | | | | | 9 | 2 | 8 | 3 | 0 | 4 | 5 | | | |
| SUBTRACT | | | | | | | | | | | 9 | 2 | 8 | 4 | 9 | 5 | 5 | | | |
| SUBTRACT (OVERDRAFT) | | | | | | | | | | | | | | | | | | | | |
| COMPLEMENT 9's | | | | | 0 | 4 | 4 | | | | | | | | | | | | | |
| COMPLEMENT 10's | | | | | 0 | 4 | 5 | | | | | | | | | | | | | |
| ADD (CORRECTION) | | | | | | | | | | | 9 | 2 | 8 | 4 | 0 | 0 | 0 | | | SUPPRESS CARRY INTO 16TH |

ACCUMULATED QUOTIENT $$\frac{41778}{45} = 928.4$$

FIG. 11

INVENTOR.
JAMES E. WARD
BY Fraser and Bogucki
ATTORNEYS

United States Patent Office 3,229,080
Patented Jan. 11, 1966

1

3,229,080
DIGITAL COMPUTING SYSTEMS
James E. Ward, Los Altos Hills, Calif., assignor to International Business Machines Corporation, New York, N.Y., a corporation of New York
Filed Oct. 19, 1962, Ser. No. 231,809
23 Claims. (Cl. 235—164)

This invention relates to data processing systems which manipulate data in the time domain, and more particularly to systems using delay lines for the generation and arithmetic processing of digital values.

Novel computing circuits using electrical delay lines to perform arithmetic operations are described in Patents No. 3,017,096 and No. 3,070,305 assigned to the assignee of the present invention. Such circuits are superior to diode logic and other prior art electronic systems for many purposes, because they provide relatively fast operating speed, and are simple and straightforward to control, readily enabling parallel arithmetic manipulation and data transfer. A principal feature of systems using such circuits is a tapped delay line which is so utilized that a digital value is represented by the amount of delay applied to a given pulse. Arithmetic operations are performed by connecting two or more tapped delay lines in cascade such that the output of the first line energizes the second, and so on. In this way, an initial pulse is displaced in time by an amount which is a measure of the value of the digit resulting from the indicated operation.

For example, pulses may be shifted in time in delay lines by amounts proportional to the numbers involved in addition or subtraction, with the total time shift of the pulses in the delay lines being detected to provide a measure of the sum or difference. Additionally, means may be provided for selectively connecting carry or borrow delay lines to provide these functions for addition and subtraction, respectively.

The cost of any system using delay line elements for providing arithmetic operations is determined both by the cost of the delay line circuits themselves, and by the ease with which such circuits may be combined into an entire system. Standard delay line elements should be as simple as is feasible but should preferably be suitable for storage of operands, arithmetic operations, and various code conversion, input, output, shifting and complementing functions. For lowest cost and best reliability the delay line elements should avoid the use of multiple taps and attendant switching circuits.

It is therefore an object of the present invention to provide improved time domain digital computing circuits.

Another object of the invention is to provide digital computing systems using the time domain for the accomplishment of a variety of arithmetic operations.

A further object of the invention is to provide digital data processing systems and subsystems using the time domain.

Arithmetic data processing circuits in accordance with the present invention achieve particular advantages by utilizing untapped time domain storage and computing elements. Representations of digital values are entered and maintained in specified time relationship to reference clock pulses within untapped delay lines. Additive and subtractive processes are effected by shifting the pulses in time relative to the reference clock pulses. Multiplication and division sequences are performed by repetitive cycling and controlled shifting of the pulse representations.

Basic data processing elements in accordance with the invention effect time domain shifting of operands by a regenerative delay loop coupled with a binary code-controlled variable delay chain. An operand represented by pulses circulating continuously in the delay loop is shifted in time by passage in a controlled sequence through selected ones of a number of delay lines whose delay intervals constitute weighted values. The arrangement is such as to achieve particular advantages in the storage, synchronization and conversion of the time domain values.

A calculating system in accordance with the invention utilizing time domain computing circuits may add, subtract, multiply and divide selected input operands. Multiplicand pulse values are represented and stored as controlled delay settings in different positions of an input register. Partial products are successively developed in different positions of an accumulator as the pulse representations are repeatedly cycled through the register until a product is obtained. The system is operated in a series of incrementing and idle cycles by which products are developed, along with appropriate carry indications in a uniform fashion for all operand values. For division, the input register positions are used to store the divisor and the dividend is initially entered and the quotient is finally developed in the accumulator positions. Division is accomplished by repeated subtractions, using complemented values of the divisor and detection of overdrafts and carries. In each instance, the circuits which are basic to the arithmetic operation comprise the delay loop and the delay chain. Results of the arithmetic operation, including products, quotients, sums and differences may be provided directly in a form suitable for control of an output device.

A number of features are provided by circuits in accordance with the present invention, and these contribute appreciably to the advantages of time domain systems in general. The delay loop, consisting of an untapped delay line and a number of gating elements, provides utmost simplicity and reliability but nevertheless stores an entire decimal digit value. The delay chain which is selectively coupled to the delay loop permits time domain shifting of the operand stored in the delay loop under control of a simple binary digit code. A 1, 2, 3, 3' binary code and the variable delay chain arrangement, moreover, permit a subtrahend or divisor value to be converted directly to its nines or tens complement.

Systems in accordance with the invention also may include unique time domain circuits for control of cycling during multiplication. A special timing loop and delay chain provide identification of the number of cycles needed during multiplication with a given multiplier digit. During division, the repeated substractions are counted until overdraft is recognized, at which time a correction cycle is undertaken, the operands are shifted, and a new subtraction cycle is begun.

Another aspect of the invention provides a ready means of synchronizing high speed calculate cycles within the arithmetic units with the relatively slower speed input or read cycles and output or punch or print cycles, which may be at a much slower rate, within the input and output devices.

A better understanding of the invention may be had by reference to the following description, taken in conjunction with the accompanying drawings, in which:

FIG. 10 is a timing chart, showing the time distribution of pulses during a typical multiplication operation, and FIG. 11 is a table of decimal values, useful in describing the sequence of value transfers taking place in a typical division operation.

Figure 1:
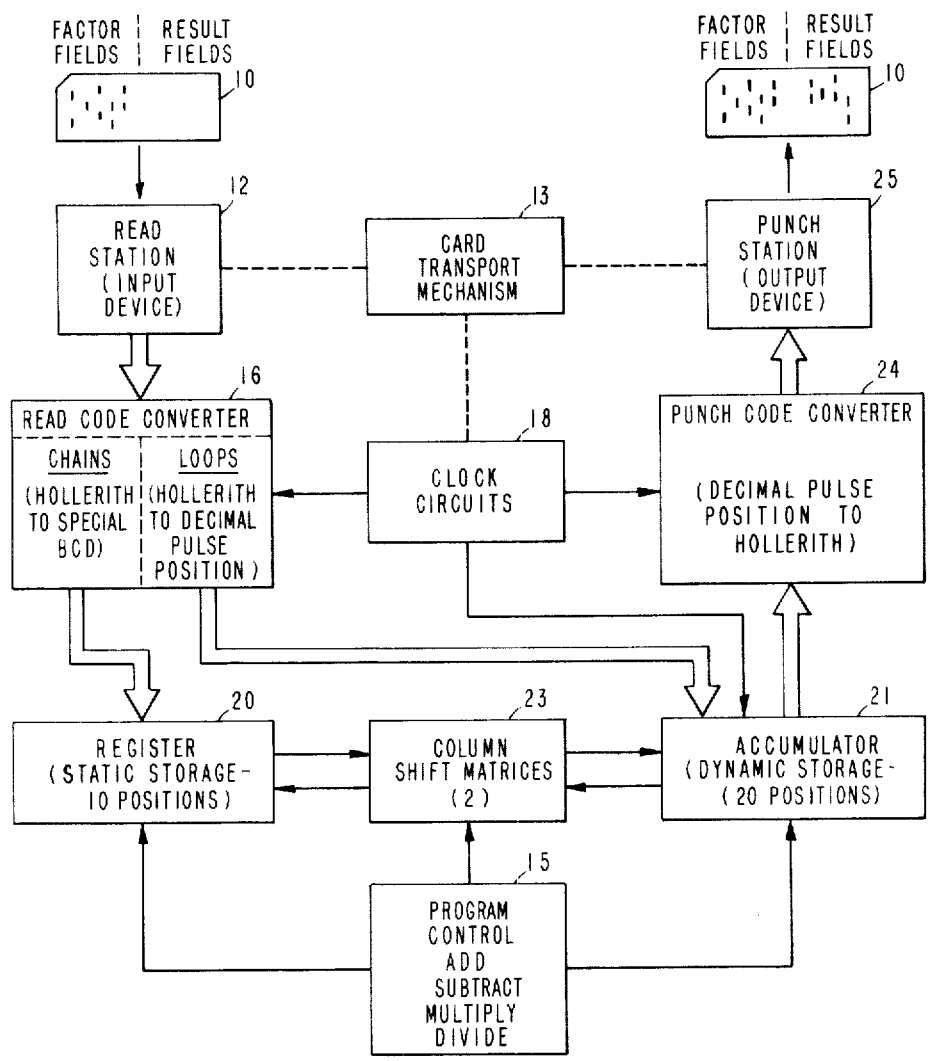
FIG. 1 is a block diagram of the principal units of a calculating system in accordance with the invention.

A digital computing system in accordance with the invention, referring now to FIG. 1, may be in the form of an electronic calculator. This is a particularly useful example, inasmuch as addition, subtraction, multiplication and division functions are performed in controlled cycles illustrative of the invention, without the extreme complexity of more general purposes machines to which the inventive concepts are also applicable.

In FIG. 1, input information to be processed may be provided from punched cards 10 encoded in the Hollerith code, and fed into a read station or other input device 12 under control of a card transport mechanism 13. The cards 10 are divided, in conventional fashion, into factor fields containing the operands and a result field into which the results of an arithmetic operation are to be entered. Although a typical card reading mechanism may be employed, it is desirable to show the card transport mechanism 13 separately, because certain timing functions are performed in synchronism with the operation of the card transport mechanism 13. Throughout the following description, it must be borne in mind that the punched card 10 may provide data in the Hollerith code in eighty columns, although less are usually used. The multiple channels corresponding to the separate columns are shown as outlined connections. Here the system units are arranged to operate upon operands having a maximum of ten decimal digits. A program control 15 is used to generate mode control signals for the various arithmetic operations, of add, subtract, multiply and divide.

The following initial description must be recognized to be a very brief and generalized one, provided in order to etsablish an overall context for the specific units which are described in detail below. Features of data processing systems which are familiar to those skilled in the art have not been discussed or reviewed at length for like reasons.

The input device 12 reads the cards 10 and provides corresponding pulse patterns to read code converters 16 which develop a special binary-decimal code for one operand and a pulse position representation for the other operand. The special binary-decimal code is not in binary progression, but advantageously uses a 1-2-3-3' weighting, for reasons given below. The pulse position code provides data pulses at varying incremental points in time relative to a fixed decimal data cycle. The read code converter 16 operates under the control of clock circuits 18 which are synchronized with the cyclic operation of the card transport mechanism 13 by a mechanical coupling. The binary-decimal data from the read code converter 16 is then applied, in parallel signal channels, to a ten-position static register 20, the various positions of which may also be referred to as delay chains. The decimal pulse position data pulses are coupled in the separate channels to a 20 position dynamic accumulator 21, the separate positions of which may also be referred to as delay loops.

The clock circuits 18 synchronize the operation of the system so as to insure that there is no ambiguity arising because of the wide discrepancy in rates between the relatively slow card read cycles and the very much faster calculate cycles. Master clock pulses which are derived from a master clock source within the system are applied to a variable energizing-pulse source which is controlled by a mechanical coupling to the card transport mechanism 13.

In the various operations, data is circulated in controlled cycles between the register 20 and accumulator 21 through two column shift matrices 23. During these data pulse circulation cycles, the program control 15 operates to provide proper complementing (for subtraction and division) and proper synchronization. Carries are passed between the different digital places in the accumulator 21 during idle cycles interspersed between the time-incrementing cycles.

When a result has been accumulated, the time domain values are applied to an output code converter 24 which generates a punch code (Hollerith code), for operating an output device 25, such as a punch station 25. The output punch station 25 enters the arithmetic result in the result field of the punch card 10.

Although the addition and subtraction functions may in accordance with the invention be provided by a separate control, they are combined in the single arithmetic program control unit 15 which also governs the multiplication and division functions. The addition, subtraction, multiplication and division control units are described in detail below.

In the present example, ten time domain registers 20 and twenty accumulators 21 are operated by the program control 15 in dependence upon which arithmetic function is to be performed. For multiplication and division, respectively, the registers 20 are each set in accordance with a corresponding multiplicand or divisor digit, and the accumulators 21 receive and store the multiplier or dividend digits, and also store the products and quotients as they are developed.

Although the system as thus very generally described corresponds in purpose to conventional punched card calculators, it will be seen to vary greatly from prior art systems both conceptually and in its physical realization. The use of the time domain in a system of this nature is wholly new, particularly as regards the implementations of the various units, the coding scheme which is adopted, and the systems by which arithmetic operations are performed.

Binary information is converted to and manipulated in time domain representation by two circuit arrangements which are of particular usefulness. Inasmuch as these novel circuits, or modifications of them, are used throughout the system, it will be convenient to describe them prior to describing how the system is built up of these fundamental unitary blocks.

The first of these units (referring now to FIG. 2) may be termed a variable delay chain 40 and provides the means for conversion from the binary-decimal code and storage of a decimal digit in the time domain. This corresponds to the static storage register 20 of FIG. 1. The weighting used for the binary code is not the usual progression of 1, 2, 4, 8, but instead the decimal digits are represented by a 1, 2, 3, 3' code. This code has several principal advantages over other four element codes, one being that it is self-complementing for purposes of subtracting and dividing by subtracting. A second advantage is that there are two 3's in the code, so that only three different line lengths are needed to establish all possible delay values for decimal digits. Another advantage is that it uses the shortest maximum delay value (3 unit-times) which can be used for a four-element decimal code.

The delay chain 40 switches between successive delay elements having values in the ratio 1:2:3 to couple the delay elements in varied series relationships. The series which is used provides an accumulated delay which, by displacement in the time domain relative to a zero-time reference, represents a decimal value.

*Table 1.—Digit to special code correspondence*

| Hollerith Card Row | Binary-Decimal Code Bits | | | | |
|---|---|---|---|---|---|
| | 1 | 2 | 3 | 3' | |
| 12 | | | | | Not encoded. |
| 11 (X) | (1) | (1) | (1) | (1) | Control only. |
| 0 | 0 | 0 | 0 | 0 | |
| 1 | 1 | 0 | 0 | 0 | |
| 2 | 0 | 1 | 0 | 0 | |
| 3 | 1 | 1 | 0 | 0 | |
| 4 | 1 | 0 | 1 | 0 | |
| 5 | 0 | 1 | 0 | 1 | |
| 6 | 0 | 0 | 1 | 1 | |
| 7 | 1 | 0 | 1 | 1 | |
| 8 | 0 | 1 | 1 | 1 | |
| 9 | 1 | 1 | 1 | 1 | |

As a card is read at the input device 12 of FIG. 1 the code converter 16 establishes the 1, 2, 3, 3' code in the form of signal patterns on individual like-designated input lines. Concurrently, a card read signal, generated when a hole in a particular column is sensed, is provided to control entry of the input values. The four different signal channels for the 1, 2, 3, 3' code are substantially alike, and only one channel need be described in detail. The first channel, associated with the 1-valued digit and utilizing a corresponding 1-valued delay, includes a one-unit delay circuit 42 designated D1.

On the application of a card read signal concurrently with a 1-valued signal, an "AND" gate 43 sets a flip-flop 44, the on-side output terminal of which conditions a further "AND" gate 45. If no coincidence of read signal and 1-valued signal occurs for the duration of the card read cycle, the high level signal provided on the off-side output terminal of the flip-flop 44 conditions a different "AND" gate 46. Both of these "AND" gates 45, 46 receive the "0" clock pulse which denotes the start of a 10 unit-time data cycle. The "AND" gates 45, 46 also may receive data pulses from the delay loop as described below. In this first stage, the "0" clock is delayed one increment, if the 1-valued input signal is present, by being passed through an activated "AND" gate 45 and then the D1 delay 42. The output signal from the first stage is coupled through an "OR" gate 48 to the next stage. If all of the remaining binary valued input signals are present, this same pulse is switched so as to pass through the following delay circuits 50, 51, 52 in succession. This condition would provide 9 unit-times of delay.

In the event that the 1-valued input signal is not present, of course, the "0" clock passes through the other "AND" gate 46 and the output "OR" gate 48 without delay to the next stage.

The flip-flops, such as the flip-flops 44, provide at least two functions in this system. They store the binary data as it is derived by reading a column of the input card. Operands are thus retained for desired arithmetic operations. The flip-flops also may be reversed into their opposite states, by complement signals applied to their trigger inputs. Complement signals are derived during operation in the subtraction and division modes, or may be derived directly from the input cards if negative operands are indicated by an "X"-punch over the low-order position of their fields. Cards may be read either "nines" first or "twelves" first. Before card read time all flip-flops are reset. If the cards are read nines first, the appropriate flip-flops are set to the digit value. If the digit is to be complemented, an "X" punch will be detected after zero read time and a signal will appear on the trigger input of all four flip-flops, reversing them to their opposite states. If, however, the cards are read twelves first, this complement signal will flip all four flip-flops to their "ON" states and the data to be read subsequently will selectively reset them, leaving the identical complementary value stored therein. In either event, the 1, 2, 3, 3' code permits immediate nines complementing of a decimal digit represented by the flip-flop states.

Figure 2:
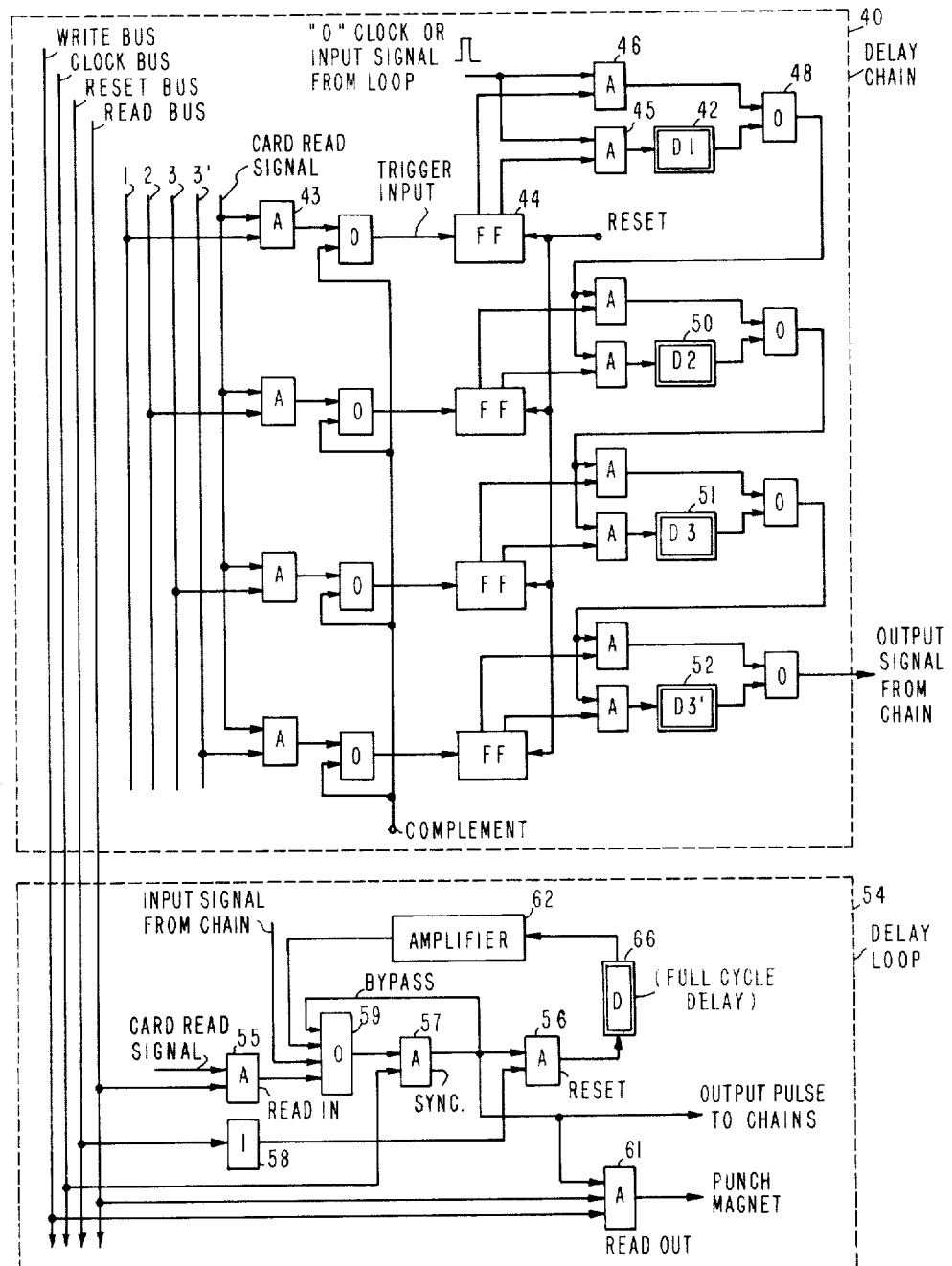
FIG. 2 is a logic diagram of circuit elements used in a delay loop and a delay chain arranged to provide basic time domain functions in accordance with the present invention.

The other principal functional unit which is used in systems in accordance with the invention may be termed a delay loop, an exemplary circuit 54 for which is also shown in FIG. 2. This circuit uses three "AND" gates 55, 56 and 57 which provide read-in, reset and synchronizing functions respectively. The read-in "AND" gate 55 is conditioned by the card or column read signal and fully activated by an input signal, occurring at a specific unit-time in the time domain on a read bus. Thus the output signal from the read-in "AND" gate 55 demarcates the start of the operation of the delay loop 54. This signal is provided through an "OR" gate 59 but is recirculated with a full cycle delay in the delay loop 54 only if certain other conditions are met. One of these conditions is that no reset signal be present to deactivate the reset "AND" gate 56 through the inverter 58, and another is that a clock pulse also be provided to the synchronizing (or sync) "AND" gate 57.

Input data signals and control signals are provided on a clock bus, a read bus, a reset bus and a write bus. The clock bus carries all ten of the clock pulses in a decimal data cycle. The read bus is synchronized with the card reading emitter mechanism and carries one selected clock pulse for each read-in point and is used during the input interval. The reset bus is held at an active voltage level for one full calculate cycle, when it is desired to erase the contents of the delay loop; the write bus is held active for one card punch cycle (9 through X with the Hollerith code). Input data pulses are entered into the loop through the read-in gate 55, "OR" gate 59, sync "AND" gate 57 and reset "AND" gate 56.

When the digital representation in the time domain is read in and applied as a signal through the synchronizing (or sync) "AND" gate 57, therefore, it is resynchronized with the clock and then used to activate the full cycle delay element 60. Input pulses are also entered into the loop at the "OR" gate 59 from the chain.

The recirculation function is carried out by passing the output signal from the delay element 60 through an amplifier 62 and back to the "OR" gate 59 which is coupled to the input of the sync "AND" gate 57. The amplifier 62 is used because the line is a passive element providing some attenuation. Other logic elements are either self-amplifying or include appropriate level setting stages which are not shown. While an output signal indication is provided from the amplified delayed signal during each cycle, the same signal is also recirculated for the next succeeding cycle unless the reset bus is activated. Preservation of the proper unit-time spacings in the time domain is insured because the sync "AND" gate 57 generates a recirculated pulse which is shaped by the master clock. Output pulses are thus properly taken, for the chains, from the sync "AND" gate 57. Alternatively, during the write cycle, a read out "AND" gate 61 is activated to pass the data pulses to the punch magnet circuits.

The fourth input to the "OR" gate 59, marked "bypass," is provided as a regenerative pulse expander. The function of this part of the circuit is to insure that the data pulses emerging from the sync "AND" gate 57 will be as wide as the clock pulses with which they are gated. If this bypass line were not in the circuit, the cycle delay element 60 would have to be manufactured to extremely close tolerance with respect to its delay value, or electrical length. If the loop delay were less than the period between successive zero clock pulses, an early return pulse from the delay element 60 would be reduced to a sliver or spike after passing the sync gate 57 in its first circulation through the loop. It can be shown that after two or three more cycles this sliver would approach zero width. To allow indefinite recirculation of the data pulse through the loop 54, and at the same time to relax manufacturing tolerances to reasonable values, then, this simple expedient is taken.

Figure 3:
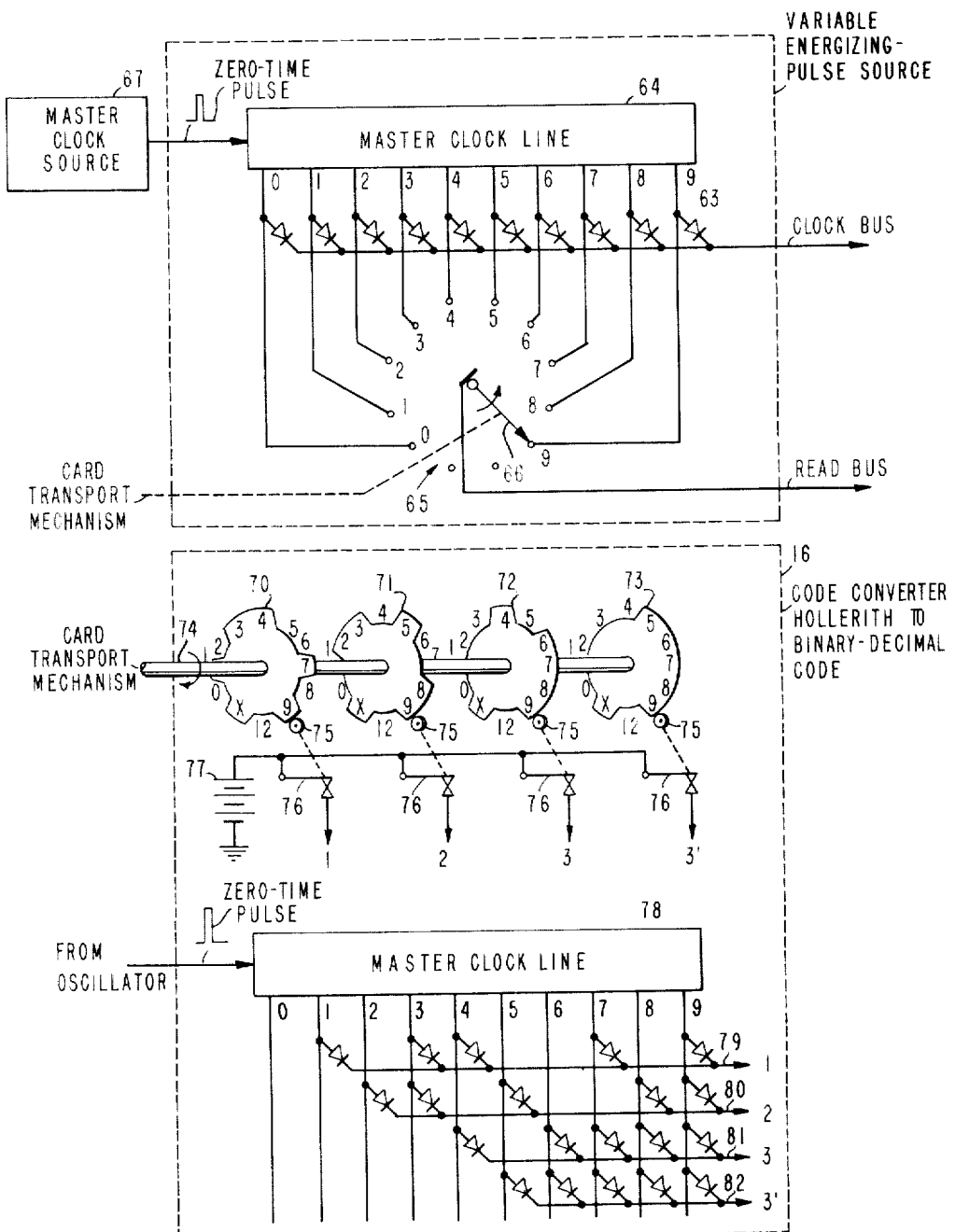
FIG. 3 is a logic diagram of a variable energizing-pulse generator source and code converter circuits arranged in accordance with the present invention.

The variable energizing pulse source is used both to convert Hollerith code to decimal pulse position in the read code converter 16 and to convert decimal pulse position to Hollerith code in the punch code converter 24. This circuitry is shown in FIG. 3. It consists of a tapped delay line in the form of the master clock line 64, and a commutator 65. The rotor 66 of the commutator 65 is driven by the card transport mechanism 13 and electrically connects the common (center) terminal successively to the twelve outer terminals, one at a time. The mechanical drive for the rotor 66 is such that as "nines" are being read or punched on the card, the rotor 66 is traversing the "9" outer segment, and so on.

The master clock delay line 64 has a delay value, or electrical length, of exactly one calculate cycle. There are ten equally spaced taps over its full length. The oscillator, or pulse generator, supplies one pulse to energize the clock line 64 every calculate cycle. This pulse is the zero-time pulse.

The ten taps from the clock line 64 are taken to the ten outer terminals of the commutator 65 such that the zero tap is connected to the zero commutator terminal, and so on. An output line is taken from the center terminal of the commutator 65 and is labelled "read bus." Pulses are available on this bus at oscillator frequency but are delayed from the zero-time pulses as a function of the position of the rotor 66. By making the read bus available to the read-in "AND" gate 55 of each delay loop 54, the digit read on the card is converted to the corresponding decimal pulse position in the time domain. The structure 64, 65 functions also as the means of synchronizing the corresponding decimal values from card rows to clock times regardless of any changes in the card feed rate with respect to the oscillator frequency.

A second lead from each tap on the clock line 64 provides an input through an isolating diode to the line labelled "clock bus." A pulse train exists on this line for every point in the calculate cycle. The pulse frequency on this train is ten times that of the oscillator. The clock bus is made available to the sync "AND" gate 57 of each delay loop 54, and is the means for sustaining indefinite recirculation of the decimal value being stored in each loop.

It should be noted that while the rotor 66 is traversing any one outer terminal of the commutator, many hundreds of pulses are being delivered to the read bus and, therefore, the read-in "AND" gates 55. Only one such pulse would be sufficient to load the delay loop 54, but as all are in synchronism, they have no adverse effect on the circuitry.

In actual practice an electronic commutator would be useful to gate the line taps to the Read Bus, but such electronic commutator would be advanced by means of the commutator 65.

It will be recognized by those skilled in the art that other forms of clock generators may also be used to provide sharply defined, properly timed pulses. The master clock source 67 may operate a frequency divider, for example, or a clock ring with logical gating circuitry may be used to provide the successive clock pulses. The arrangement shown is chosen because it provides ready visualization of the arrangement.

In the Hollerith code, numerical values from 0 to 9 are represented by punches in individual positions which are usually read 9's first. These decimal values are converted to a binary-decimal code having the 1, 2, 3, 3' weighting by the code converter 16 of FIG. 3. The code converter 16 includes a mechanism which is synchronized with the card transport mechanism and which has four different rotating plate cams 70, 71, 72 and 73 mounted on a common shaft 74. The cams rotate to different cam positions as they are sensed. The lobes of the cam define patterns corresponding to the values needed for each binary place in the equivalent decimal value. Separate cam followers 75 cooperate with each of the rotary cams 70 to 73, and each cam follower 75 controls an associated switch 76 which couples a different output conductor in circuit with a common D.C. source 77. A closed switch therefore provides a signal on an output lead which is representative of a value at a particular binary place in the 1, 2, 3, 3' code. The four values taken together constitute the binary-decimal representation.

This mechanical device is used only during the card read and punch cycles. It is not employed during the internal transfer operations which may be carried out during certain arithmetic sequences. During these times, the pulses from the master clock source are applied to different outputs from the master clock line 78 having ten equally spaced taps and a total electrical length corresponding exactly to one calculate cycle. Four different diode-isolated common buses 79, 80, 81 and 82 are coupled to these different output taps in patterns corresponding to those required for the 1, 2, 3, 3' weighting. Both code conversion mechanisms provide the same function, although at greatly different speeds.

Figure 4:
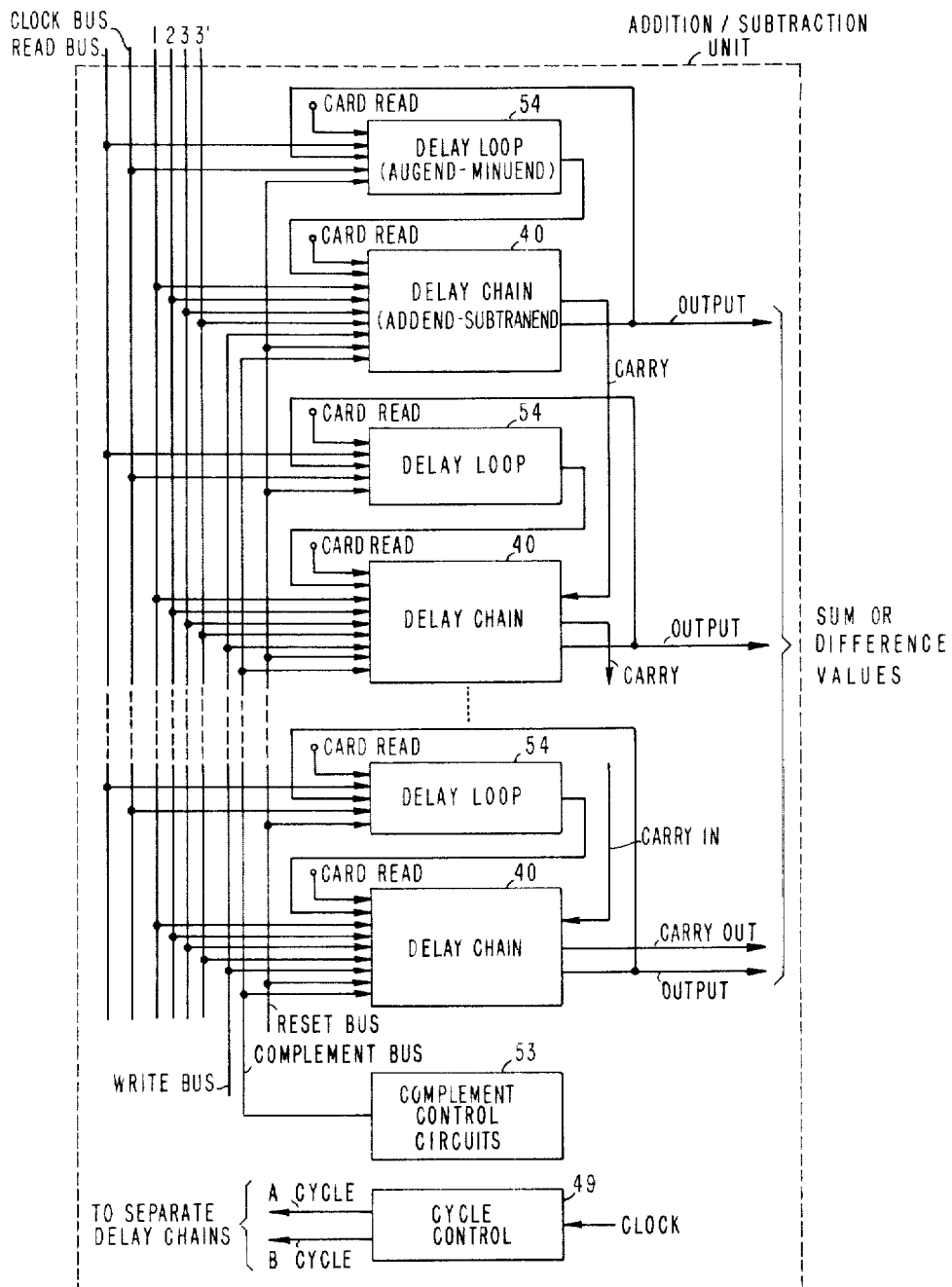
FIG. 4 is a block diagram of the arrangement of the elements of an addition/subtraction unit which may be used in the system of FIG. 1.

An addition and subtraction unit which may be employed in the arrangement of FIG. 1 is shown in more detailed form in FIG. 4. The delay loops and chains shown therein also serve for multiplication and division, differing only in the control units involved. A prior discussion of addition and subtraction will serve to aid understanding of the more complicated multiplication and division functions. This unit employs delay chains 40 and delay loops 54 in columnar arrangements which permit addition or subtraction of two operands. For conformity to the remainder of the system, it is assumed that ten-digit numbers are to be added, so that ten different adder stages, each consisting of a delay loop 54 and a delay chain 40, are employed (although only a part of these are illustrated in FIG. 4).

In each adder stage, the delay loop 54 is gated to receive the augend or minuend value from the input source and also the card read signal. The delay loop 54, shown in detail in FIG. 2, and discussed fully with respect to that figure, is operated in synchronism with the remainder of the system under control of the energizing pulse source 24. The reset signal is provided by the delay loop 54 to recirculate the data pulse therein.

The delay chain 40 in each adder stage receives the addend or subtrahend values from the coupled read busses, as described in detail in conjunction with FIG. 2. Complement signals may be applied to the appropriate flip-flops within the delay chains 40 for subtraction in accordance with the signs of the operands and the operation to be undertaken. Complement control circuits 53 of conventional design may control the decision to complement the values in the chains. The input signal for each delay chain 40 is the output signal from the delay loop 54 of the same stage. The augend is thus advanced in time an amount determined by the addend during addition. Carry circuits are employed between each delay chain circuit and the delay chain circuit in the next higher order. These carry circuits are not shown in FIG. 2, and have not been shown in detail in FIG. 4, inasmuch as they are discussed extensively in conjunction with the multiplication and division units.

When read-in of the operands has been completed the addition or subtraction may be completed in a two cycle sequence. In the first cycle the data pulses are time-shifted in accordance with addend or subtrahend values, and carry signals are appropriately indicated from each stage to the next higher order stage. The carry signals set up single unit delays in the proper stages, so that when the signal derived from a stage is fed back through its delay loop 54 it may again be passed through the stage with carry properly provided for, but without further incrementing except for the carry. These two cycles, which may be termed A and B cycles respectively, are identified by corresponding signals from a cycle control circuit 49 which operates off the clock.

Subtraction is, of course, essentially addition with a tens complemented subtrahend. Tens complemented values are provided by inverting each flip-flop in a delay chain 40 to derive the nines complement, and adding one (or a carry) to the lowest order position to provide a tens complement. By feeding in lowest order digits to the first stage, only this stage need have a carry added. If highest order digits are always fed to the highest order position, a zero-sensing ring may be used, as described in conjunction with the multiplication and division units. Other details of addition and subtraction, such as the incorporation of carry and the control of cycling, are fully set out in conjunction with multiplication and division and thus are not given here.

An output signal is provided from each delay chain 40 to represent the digital result which is derived from the arithmetic operation. The sum or difference values which are thus indicated may be used to control an output device (FIG. 1) directly, or may be converted to some other form for control or for recording.

In summary, operation of the addition/subtraction unit of FIG. 4 consists of the use of the accumulated delays of the delay loop 54 and the delay chain 40 in each of the ten stages of the addition/subtraction unit. The augend or minuend digit is entered in the delay loop, to which is also applied the single card read pulse at one of the ten calculate cycle points established by the card segment over which the emitter brush is passing when a signal is received from the card read brush at the input device 12. The single pulse which is admitted to the delay loop 54 is circulated for any desired length of time by being synchronized with the clock pulse. The operation may continue substantially without interruption, except of course for power failure, with the data subsequently being extracted for the arithmetic operation.

The addend or subtrahend digit is entered in the delay chain 40, which constitutes a variable length delay line connected in series with the delay loop 54. The output signal from the delay chain 40 is the cumulative total, on the time scale, of the delays introduced by the loop 54 and the chain 40. By taking into account the carries between these successive stages, full addition for each of the two ten-digit numbers is carried out in the time domain without the use of specially constructed delay lines or complicated gating arrangements.

MULTIPLICATION/DIVISION

The multiplication/division units within the system of FIG. 1 consist of a number of separate units which work together in highly integrated fashion. An understanding of the arrangement and the operation is best obtained by first providing a detailed review of the functions of the multiplication/division units, and then providing examples of the multiplication and division operations.

Figure 5:
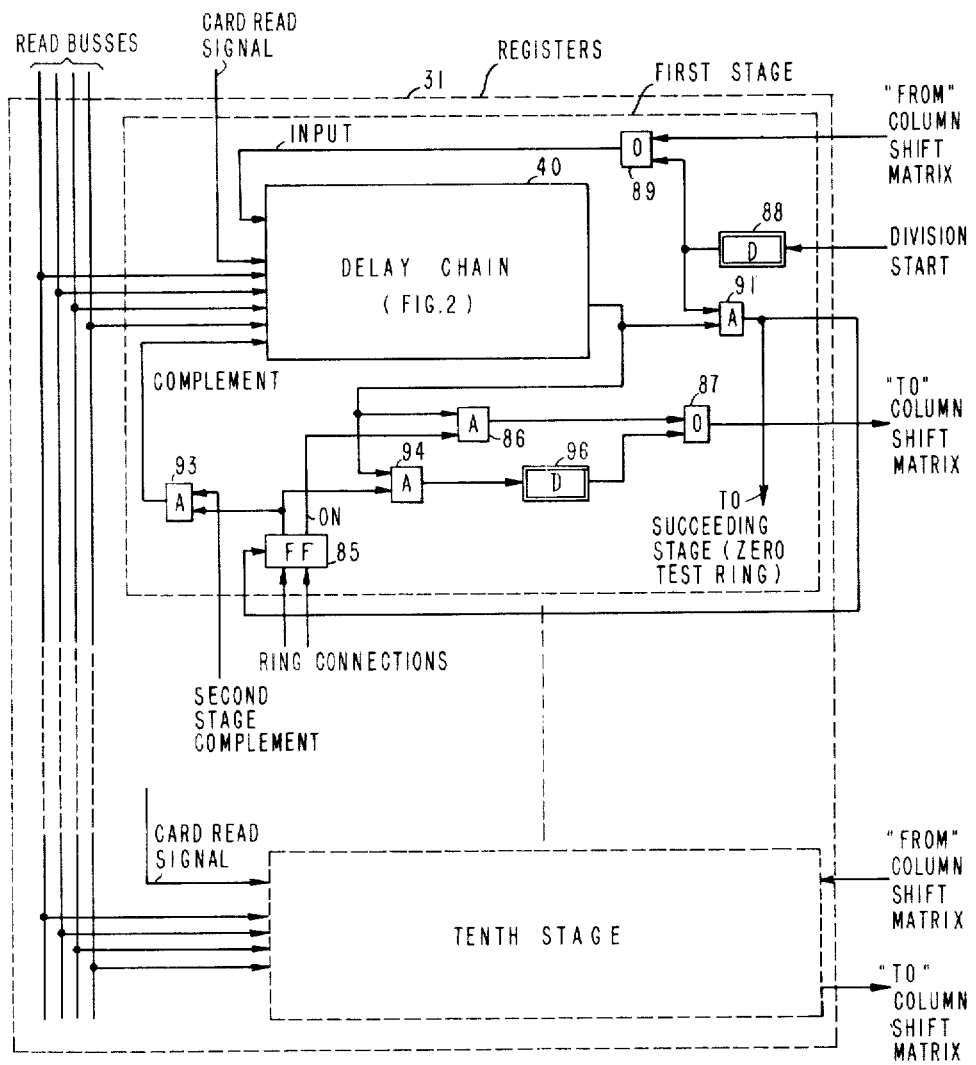
FIG. 5 is a logic diagram of an input register useful in the multiplication/division portions of the arrangement of FIG. 1.

Referring now to FIG. 5 as well as FIG. 1, there are ten stages or digital positions of registers 31, each including a delay chain 40. A fifth delay element, providing a single unit of delay in the calculate cycle, has been added to the delay chain 40 to permit conversion of 9's to 10's complements for division operations. It will be noted that the same feature is employed in the stages of the addition/subtraction unit to permit complement conversion. The registers 31 receive either the multiplicand or the divisor values, each of the different ones of the digits of these values being provided to a different one of the stages from the read busses along with the card read signal, as previously described in conjunction with FIG. 2. During a multiplication or division operation, signals are derived from the "FROM" column shift matrix and are provided to the "TO" column shift matrix.

In multiplication operations, each stage of the registers 31 stores and presents a different digit of the multiplicand. A flip-flop 85 forming a part of a trigger ring in the program control units, described below, conditions an "AND" gate 86 which receives the output signals from the delay chain. This "AND" gate 86 is coupled directly to an "OR" gate 87 which provides output signals to the "TO" column shift matrix. In division, however, tens complementing is employed, including a zero-test sequence for the lowest order significant digit. Division start signals derived from the division control unit are applied to a one unit-time delay circuit 88 in the lowest order stage. The pulse from the delay circuit 88 is applied through an "OR" circuit 89 to the input of the delay chain 40, and concurrently to one input of an "AND" gate 91 which is also coupled to receive signals from the output of the delay chain 40. If signals are present on both input terminals of the "AND" gate 91, this indicates that the delay chain 40 is set to zero delay. The zero-test for the lowest order stage is thus completed and the output signal from the "AND" gate 91 is then passed to the next higher order stage for a similar test. This sequence, and the inter-connections of the flip-flops in the zero-test ring are discussed more in detail in conjunction with the division program control unit, described below with respect to FIG. 9.

Briefly, however, for tens complementing each flip-flop 85 in a stage above the lowest order significant digit is caused to condition an "AND" gate 93, which controls the complement input of the delay chain 40. All lower order stages are not complemented. Complement signals are passed sequentially through these "AND" gates in the different stages to invert each of the flip-flops in the chain, thus providing the nines complement because of the 1, 2, 3, 3' code. At the lowest order stage containing a significant digit, the intercoupling is such that an additional "AND" gate 94 is conditioned to pass output pulses from the delay chain 40 to a one unit delay circuit 96. Thus, output signals at this one stage have an additional unit-time delay, providing the necessary adjustment for the tens complement.

Figure 6:
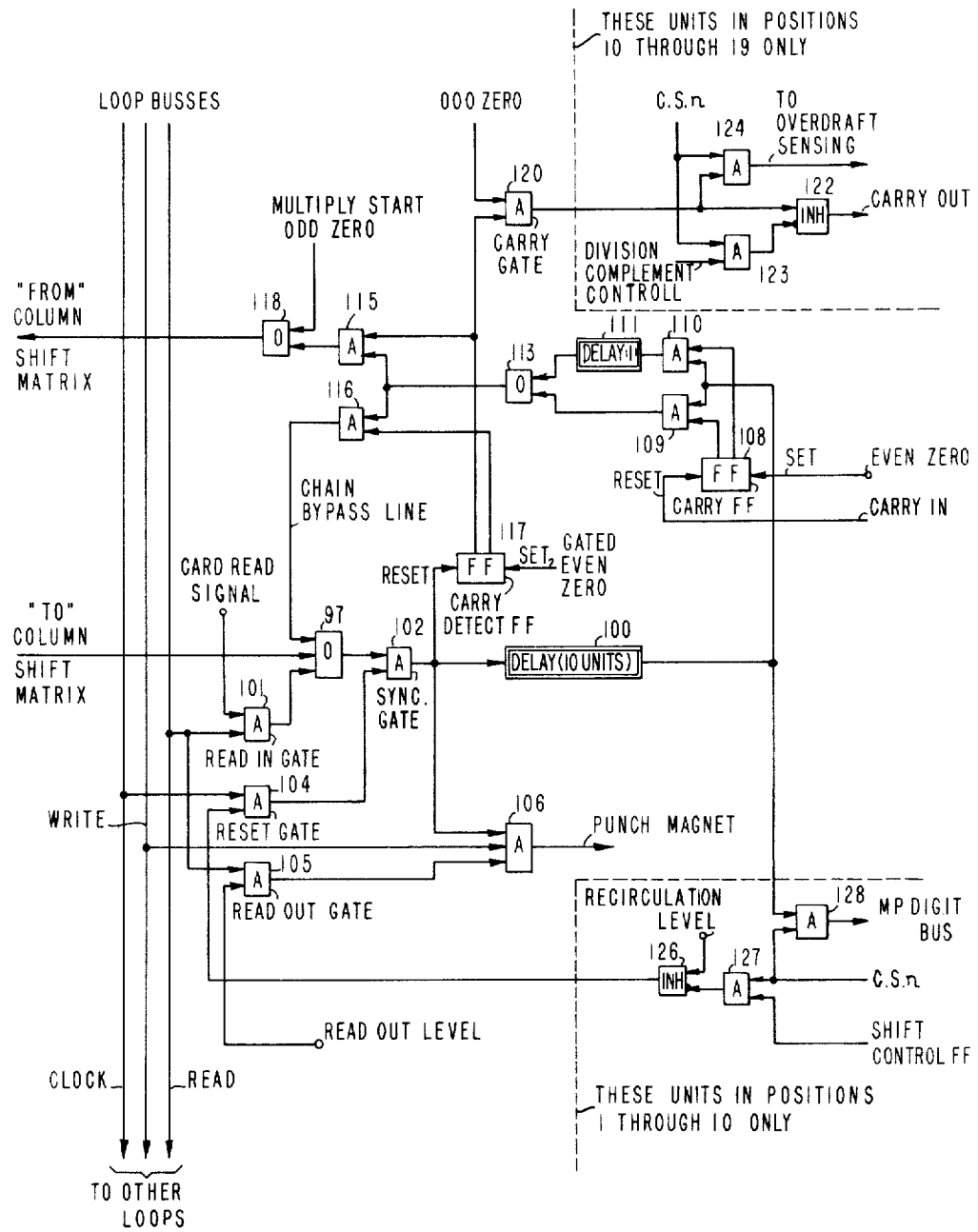
FIG. 6 is a logic diagram of an accumulator useful in the multiplication/division portions of the arrangement of FIG. 1.

The accumulators 21 shown in the block in FIG. 1 are represented in the diagram of FIG. 6. For simplicity, the twenty sets of components have not been shown in detail. Instead, a typical single example of one of the accumulator positions is shown and the variations for different positions are indicated. Briefly, these variations are that the first accumulator position has no carry-in, the twentieth has only provision for carry-in, or overflow digits (thus has no carry-out), the first through tenth positions are used to store the multiplier digits while the tenth through nineteenth positions are used to develop the quotient digits. The first through ten positions thus include means for reading out the multiplier digits, as shown in the lower right-hand part of FIG. 6, and the tenth through nineteenth positions include means for indicating carries and overdrafts, as shown in the upper right-hand part. Some of these elements are repeated in FIG. 9.

A feature of systems in accordance with the invention is the provision of idling intervals which permit uniform time domain operation, independently of operand values. During time domain shifting, active accumulator positions are coupled to the registers through the column shift matrices. During idling intervals, the signals are recirculated within the accumulators by use of a chain by-pass line in the circuit of a delay circuit 100 which forms an important part of the accumulator.

As previously discussed in conjunction with FIG. 2, the accumulator delay loop is coupled to the clock and the read busses, and is also coupled to receive the card read signal. The input signals are provided via the "TO" column shift matrix, being fed through an "OR" circuit 97 into the delay circuit 100, which provides ten unit-times, or a full calculate cycle, of delay. Input signals thus are provided on the column shift "TO" matrix, or on the chain by-pass line, or by a read-in "AND" gate 101 which is coupled to receive the card read signal and the signals on the read bus. Proper timing relationships are insured by the use of a sync gate 102 which is conditioned by a reset "AND" gate 104, which is in turn conditioned by the normally present recirculation control signals and fully activated by the clock pulses. The data in the accumulator position may be provided to an output device upon activation of a read-out "AND" gate 105 which is controlled by a "read-out" signal and by signals on the read bus. The read-out "AND" gate 105 controls a further "AND" gate 106 which therefore selectively passes signals from the sync gate 102 to a punch magnet (not shown) or other output device 30 with the proper synchronization between the read and calculate cycles.

The output signals from the delay circuit 100 are either returned through the chain by-pass line or idling or directed to the "FROM" column shift matrix, under control of a carry flip-flop 108 having one input coupled to receive carry signals from the next lower order. The other, or set input of the carry flip-flop 108 is actuated by even zero pulses provided on an appropriate bus. These even zero pulses are derived from the clock bus, and through a gating arrangement (not shown) of conventional nature which extracts every other zero-time pulse. When the carry flip-flop 108 is set, its output lead coupled to an "AND" gate 109 is "high," conditioning the "AND" gate 109 to pass the output signals from the delay circuit 100. When a carry signal has been applied to the carry flip-flop 108, its other output terminal conditions a different "AND" gate 110, causing this "AND" gate 110 alternatively to pass signals from the delay circuit 100 through a delay circuit 111 which provides a single unit of delay. This shifts the data pulse by one unit-time and adds the carry to the quantity represented.

Signals from both of these paths are combined in an "OR" circuit 113, and then applied to each of a pair of "AND" gates, 115, 116 which determine the further routing of the signals. These "AND" gates 115, 116 are controlled by the different outputs of a carry detect flip-flop 117 which is set by the even zero pulses, and when set conditions a first of the "AND" gates 115. When reversed in state by an output pulse from the sync gate 102, the carry detect flip-flop 117 conditions the other "AND" gate 116, passing pulses from the "OR" circuit 113 back through the chain by-pass line and the sync gate 102 to the delay circuit 109.

After reset of the carry detect flip-flop 117 without an intervening set pulse, the data pulses are returned to the "FROM" column shift matrix from the first of the "AND" gates 115 through an "OR" circuit 118. Odd zero pulses provided at the start of multiplication are also provided to the "OR" circuit 118 for the initiation of a multiplication operation.

Carry output signals are provided under control of the carry detect flip-flop 117. The setting of the carry detect flip-flop 117 by an even zero pulse conditions one input to a carry "AND" gate 120 to which odd zero pulses are also applied. If the carry detect flip-flop 117 is not reset by a pulse passed through the sync gate 102 before the odd zero pulse, the odd zero pulse passes the carry gate 120 and is directed through the associated circuitry to appear as a carry output signal. This associated circuitry, shown in the upper right-hand portion of FIG. 6, appears only in accumulator positions 10 through 9, the positions being those used to develop the quotient digits. For this purpose, the carry signals are provided through an inhibit gate 122, the inhibit output of which is controlled by an "AND" gate 123. This "AND" gate 123 is actuated by individual column shift signals (C.S.n) and division complement control pulses. The column shift signals (C.S.n) correspond to the individual actuating signals for the matrices at each position. They are also provided to a second "AND" gate 124 which further receives the carry out pulse. When the division complement control signal is provided along with the appropriate column shift signal for that accumulator position, the carry output signal is inhibited, an overdraft signal is provided from the "AND" gate 124 instead. These signals at specific accumulator positions are used in the generation of quotient values.

Certain other circuit portions vary as well. At the lowest order position, there is no carry in, so that the carry flip-flop 108 and the delay circuit path which serves as an alternate to the "OR" circuit 113 need not be employed. At the twentieth position, on the other hand, only the carry in or overflow pulses from the nineteenth position are transferred, so that at this position the delay chain and chain by-pass arrangement are not employed.

The circuits shown in the lower right-hand corner of FIG. 6 are present only in the first through tenth positions of the accumulator, these positions being those used for the multiplier. Normally, the signal which is provided to maintain recirculation of the data pulses is passed through an inhibit gate 126 through the reset "AND" gate 104 to condition the sync gate 102. The inhibit input of the inhibit gate 126 is controlled by the output signal from an "AND" gate 127 to which are applied column shift signals (C.S.n) corresponding to the next succeeding position, and signals from a shift control trigger described below.

At specific times, as when a multiplier digit has been read out, the accumulator from which the multiplier digit was taken is thereby cleared.

The column shift signals (C.S.n) are also applied to an additional "AND" gate 128, to condition this gate 128 for the pulses derived from the delay circuit 110. Pulses passed through this "AND" gate 128 are then coupled to the digit bus as multiplier digits. This insures that multiplier digits are provided in proper succession during a multiplication operation. Inasmuch as multiplier digits are stored in only the first ten accumulator positions such circuits are needed in only these positions.

Figure 7:
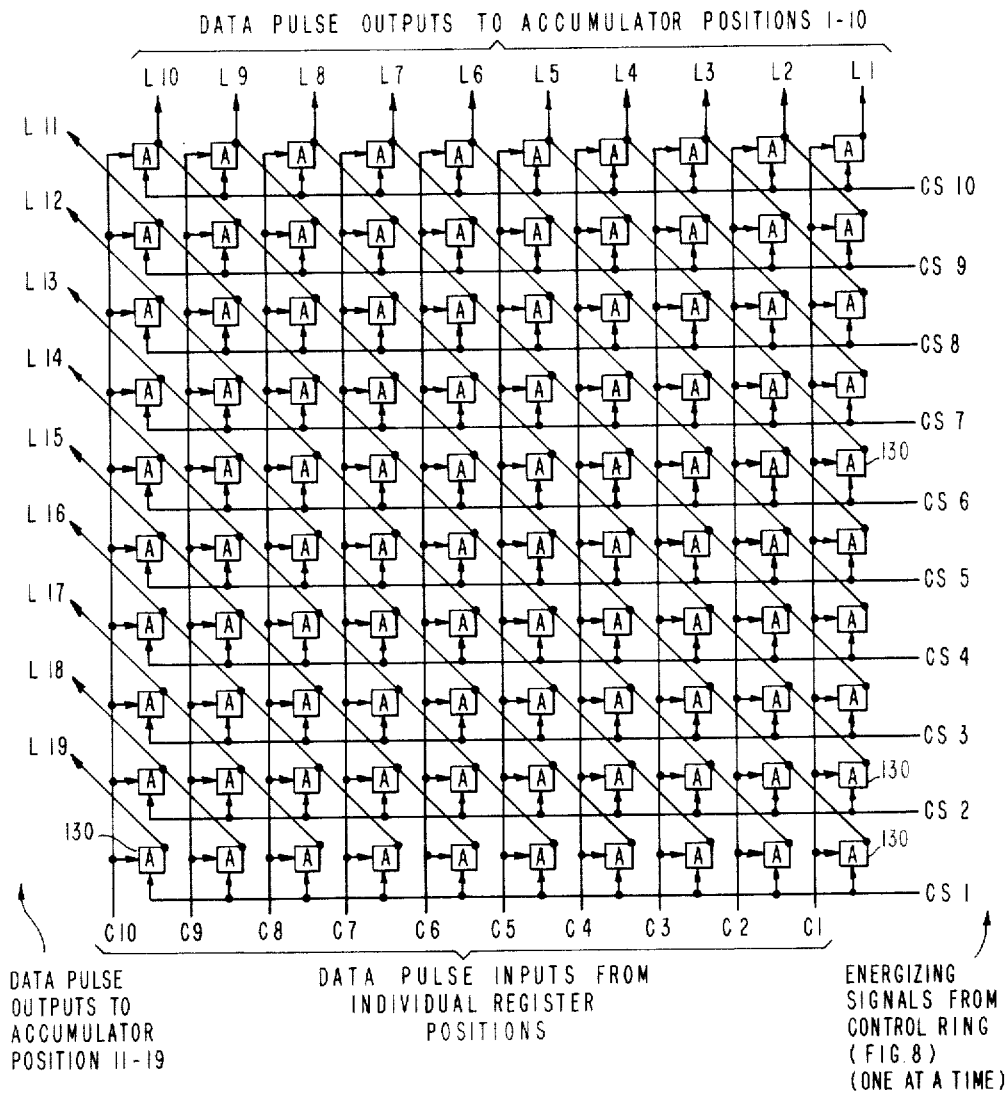
FIG. 7 is a logic diagram of a column shift matrix which may be employed as the "TO" and "FROM" matrices in the arrangement of FIG. 1.

The two column shift matrices in the system of FIG. 1 are substantially alike. An example of such a column shift matrix is shown in FIG. 7, this being the "TO" matrix 37. The references of "TO" and "FROM" are taken with respect to the change in the register (FIG. 5), and the flow of data goes from the registers 31, to the "TO" column shift matrix 37 and thence to the accumulators 32, or from the accumulators 32 to the "FROM" column shift matrix 38 and thence to the registers 31. The ten digits of the operand are contained within the ten positions of the registers 31, but twenty positions are used in the accumulators 32 during multiplication and division. The matrices 37, 38 are needed to couple together different digital positions of the operands during multiplication and division so that partial products may be accumulated and quotients developed in proper fashion during these arithmetic operations. During addition and subtraction no shifting is needed and only a single position of the matrices need be energized.

The matrix of FIG. 7 consists of an arrangement of 100 "AND" gates 130, groups of ten of which are conditioned by different column shift signals, hereafter designated as CS1, CS2 . . . CS10, respectively. These signals are successively generated by a control ring of flip-flops in the multiplication program control unit 34 (FIG. 8), in a manner described in more detail below. The additional input signals for the columns of the matrix are the data signals from the different positions of the registers 31, these being designated C1, C2 . . . C10, respectively. The output signals are the data signals which are applied to the different positions of the accumulator, these signals being designated L1, L2 . . . L19, respectively.

By these matrices the ten register positions are controllably coupled to the nineteen connectible accumulator positions, in groups of ten at a time. The "AND" gates 130 are interwired such that the ten register positions are coupled with the tenth through nineteenth accumulator positions while the lowest column shift line (CS1) is energized. Time domain data pulses which are applied to an "AND" gate 130, therefore are directly transmitted on a corresponding line to an appropriate position of the accumulator. The control ring of the multiplication program control unit successively energizes individual ones of the column shift input lines during division as well as multiplication operations. A shift is made after each parallel multiplication of all the multiplicand digits by a given order multiplier digit. For example, after multiplication by the highest order multiplier digit, the CS1 line is de-energized and the CS2 line is energized to couple the ten register position to the ninth through eighteenth accumulator positions. For division, the shifts occur following each detection of an overdraft condition.

The multiplication program control unit 34 is specifically designed for the multiplication of a ten-digit multiplicand by a ten-digit multiplier, although other examples might have been chosen. The multiplication control unit includes a number of subcombinations which may conveniently be discussed separately, although the entire unit is highly coordinated.

Figure 8:
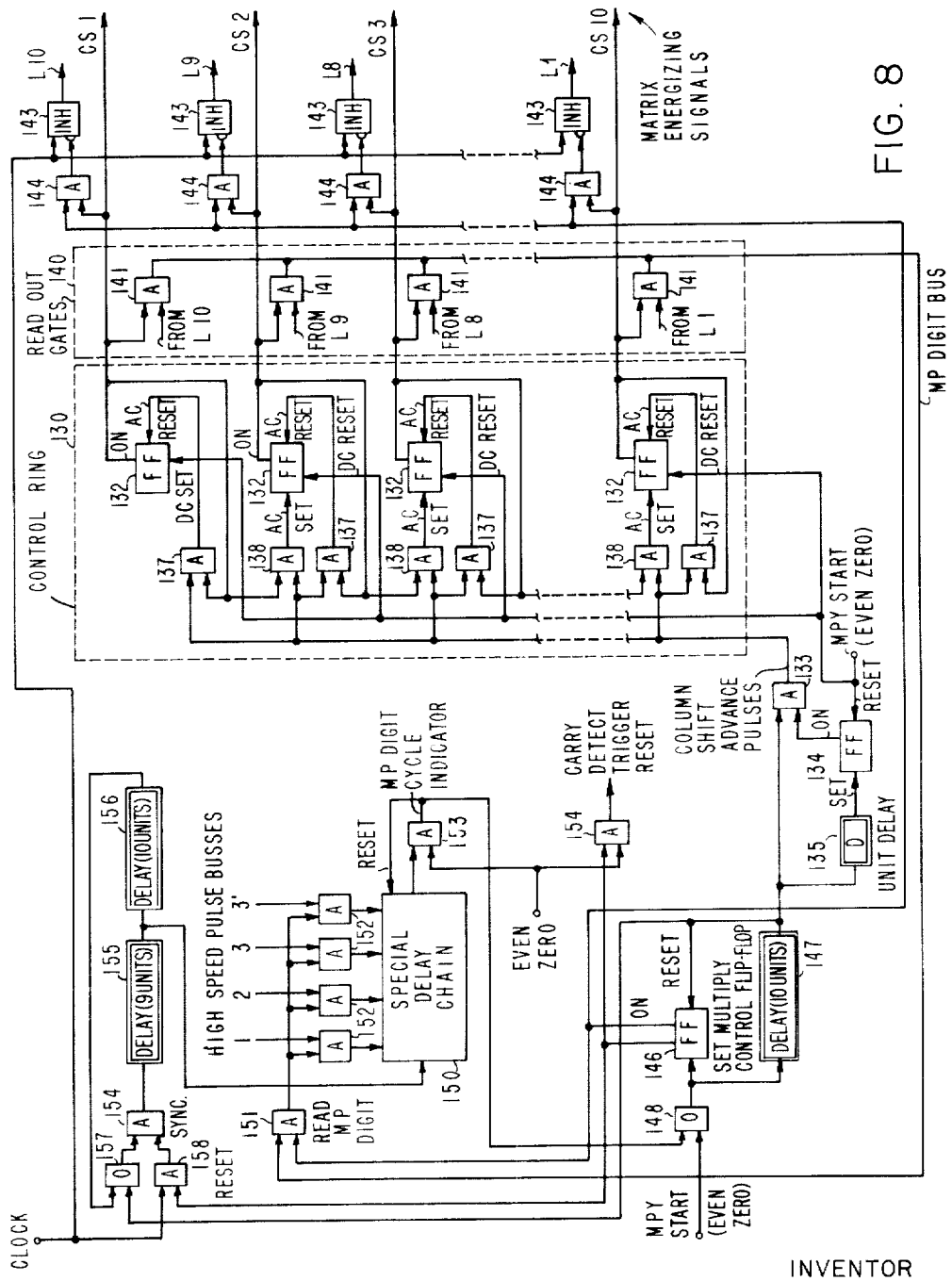
FIG. 8 is a logic diagram of a multiplication program control unit for the arrangement of FIG. 1.

In FIG. 8 is represented a control ring 130 of ten flip-flops 132, only a few of which have been shown for simplicity. A multiply start pulse at even zero time is applied to start the multiplication operation. The multiply start pulse is coupled to the D.C. set input at the first of the flip-flop 132 positions, turns it "ON" to provide the CS1 signal. Concurrently, the multiply start pulse actuates the D.C. reset inputs of the remaining flip-flops 132, turning them "OFF." Thus only the CS1 signal is provided as a column shift signal. Triggering of the control ring 130 on successive operative cycles causes the flip-flops 132 to reverse in succession, activating the CS1, CS2, CS3, etc., lines in sequence.

This triggering of the control ring 130 is controlled by the intercouplings of the flip-flops 132, by a group of input "AND" gates, and by column shift advance pulses. The column shift advance pulses are provided from an "AND" gate 133 which is conditioned by the "ON" output signal from a flip-flop 134 which is initially reset to the "OFF" state by the multiply start pulse. Thereafter, the multiply start pulse, delayed 10 unit-times by other circuitry, is again applied to the "AND" gate 133 but does not effect a column shift because the gate 133 is deactivated until the flip-flop 134 is set after a further unit-time of delay by passage of the signal through a delay circuit 135. Subsequently pulses are derived to indicate the completion of multiplication with each multiplier digit. These are transferred through the "AND" gate 133 as column shift advance pulses.

Within the control ring 130, certain "AND" gates 137 are connected at each position to receive the column shift advance pulses, and also "ON" signals from the associated flip-flop 132. These "AND" gates 137 control the A.C. reset inputs of the associated flip-flops 132, and accordingly turn off the one flip-flop which was previously in the "ON" state.

Concurrently, other "AND" gates 138 at each position are conditioned from the "ON" output of the flip-flop 132 of the previous position. These "AND" gates 138 control the A.C. set inputs, and thus turn "ON" the next individual flip-flflop 132 in the ring 130 as the previous one is turned off.

The matrices of FIG. 1 thus are controlled for column shifting by the control ring 130 during multiplication and division. The control ring 130 also operates a group of read out gates 140 which are coupled to read out the stored multiplier digits from the accumulator to a multiplier digit bus. In the first position, for example, the "ON" condition of the first position flip-flop 132 primes an "AND" gate 141 which is coupled to receive data pulses from the tenth accumulator position, indicated by L10. When the CS1 signal is provided, the L10 data pulses are read to the multiplier digit bus. Similarly, when the CS2 signal is provided the L9 data pulses appear on the bus.

The control ring 130 also provides a means of clearing out multiplier digits from the accumulator as they are read in for multiplication. Clock pulses normally pass inhibit gates 143 to the associated accumulator positions, where they are then used at reset gates as described above to control recirculation of the data. These clock pulses are inhibited for selected intervals at the active accumulator order as the stored multiplier digit is read out. To this end, an "AND" gate 144 at each position is conditioned by the "ON" output signal from the associated flip-flop 132 in the control ring 130. A signal from the multiply control flip-flop (described below) which is applied to all these "AND" gates 144 fully activates the "AND" gate 144 at the active position. The signal from the "AND" gate 144 controls the inhibit function to terminate the recirculation of data and to clear the accumulator position for product data pulses.

The multiplication program control unit also includes the multiply control flip-flop 146 and a 10 unit-time delay circuit 147 which receives the multiply start pulses and other pulses which denote the completion of a given multiplication through an "OR" circuit 148. The multiply control flip-flop 146 is set "ON" initially, then reset after ten units of delay, in which state it remains until the multiplication with a single digit has been completed.

Multiplier (MP) digits are stored in succession, during multiplication, in a special variable delay chain 150 which includes four bistable elements in the arrangement of the circuit of FIG. 2. Data pulses in time domain code provided on the MP digit bus are converted into the 1, 2, 3, 3' code and used to provide corresponding delay settings at the special delay chain 150. The data pulses are coupled through a read "AND" gate 151 controlled by the "ON" state of the multiply control flip-flop 146, and pass to a set of "AND" gates 152 which receive successive 1, 2, 3, 3'-valued pulse patterns and form a time domain-to-binary converter, as above described. Output data pulses from the special delay chain 150 are tested against even zero pulses at an "AND" gate 153 which supplies what may be termed a "cycle indicator" pulse for each multiplier digit, indicating the completion of multiplication with that digit.

Certain timing and counting functions are also performed within the multiplication program control unit. As long as the multiply control flip-flop 146 is "OFF," even zero pulses pass an "AND" gate 154 to provide reset signals for the carry detect flip-flop in the accumulators. A special timing loop for multiplication is formed of a serially-coupled nine unit-time delay circuit 155 and a ten unit-time delay circuit 156. Pulses from the delay circuit 147 following the start or completion of multiplication, and during the "OFF" status of the multiply control flip-flop 146, are entered into this special timing loop and continually recirculated in synchronism with clock pulses as long as a reset "AND" gate 158 is activated to insure conditioning of a sync "AND" gate 159. The output pulse from the timing loop forms the input pulse for the special delay chain 150, and is used in sensing the end of multiplication with a given multiplier digit.

EXAMPLE OF MULTIPLICATION

A multiplication operation may best be understood by reference to the variable delay chain 40 of FIG. 2 and the multiplication control unit of FIG. 8 which operates in conjunction with the matrices (FIG. 7), the ten registers (FIG. 5) and twenty accumulators (FIG. 6) to perform the multiplication function. Briefly, the multiplicand digits are fed into the various register positions, while the multiplier digits are set into the lowest ten accumulator positions. The multiplicand value is then successively multiplied by each of the digits of the multiplier, starting with the high order digit first. The multiplicand digit values, consisting of data pulses in time domain code, as previously described, are successively time shifted by increments determined by the multiplier digit values. A unique cycling sequence is employed, however, which depends partly upon whether carries are detected and which uses both shift and idle phases.

The successive shifts are carried out using the delay chains in the registers. In the idle phases the accumulator is coupled so that the data pulses bypass the delay chains and proceed instead through a full cycle delay unit. As these shifts in the time domain are effected, appropriate carry signals are passed between accumulator positions to properly adjust the product as it is accumulated. At the end of multiplication with a given multiplier digit the matrices are shifted one position and a new mutiplier digit is entered. Products are derived and stored as data pulses in the proper positions in the accumulator.

Counting of the number of cycles corresponding to the multiplier digit is determined by the special timing loop. As they are used, the multiplier digits are erased from the accumulator positions to make room for further product values. When the full product value is contained within the accumulator it may then be provided to the output device and the next operands inserted for a similar multiplication. Following are the detailed multiplication steps in an operation.

*Entry of operands.*—Both operands are assumed to be ten decimal digit figures, originally in Hollerith code, and represented by corresponding electrical signals generated by the input device 12. The multiplicand digits are entered into the successive stages of the registers 31 (FIGS. 2 and 5), with the high order digit in the tenth register position, after conversion by the code converter 16 to the binary-decimal code. These values are then retained in the same register positions for reception, and proper shifting in the time domain, of signals from the then-associated accumulators. The complement values and complement control circuitry are not employed in multiplication.

The multiplier values are entered into the accumulator positions (FIG. 6) starting with the high digit in the tenth accumulator position. It will be recalled that there are twenty accumulators 21 (FIG. 1) but ten of these are used in each stage of multiplication for accumulation of the partial product. For entry of these values, the input signals are successively converted to time domain data pulses by converters 99 and these values are entered into the full cycle delay elements 100 within each accumulator. The multiplier is entered into the first to tenth accumulator positions, with the high order digit being entered in the tenth accumulator position. The digits continuously circulate in the loops without shifting, until they are coupled into the variable delay chains during the multiplication operation, at which time they are erased.

*Single multiplication step.*—In the first multiplication step, the high order multiplier digit is multiplied against the multiplicand, and the resulting digits are stored in the available accumulator positions. After initial entry of the multiplier in the accumulators (FIG. 6), the high order multiplier digit must be entered into the special delay chain 150 of FIG. 8. In the multiplication program control multiply start pulse sets the flip-flop 134 "OFF" and only the first flip-flop 132 in the control ring "ON," supplying the CS1 signal. The "AND" gate 141 in the read out gate group 140 which is coupled to the L10 line (the highest accumulator position) is thereby conditioned to supply the highest order multiplier digit data pulse on the multiplier digit bus. At the special delay chain 150 this data pulse is entered through the read MP digit "AND" gate 151, which is conditioned during this interval by the "ON" signal from the multiply control flip-flop 146. The time domain representation is then converted to the 1, 2, 3, 3' code at the "AND" gates 152 and entered into the special delay chain 150. After the data cycle is completed, the start pulse provided through the delay circuit 147 resets the multiply control flip-flop 147 and deactivates the read MP digit "AND" gate 151.

The special delay chain 150 and the special timing loop now control the number of times the multiplicand value will be added to itself in a multiplication process. The control ring 130 concurrently energizes the CS1 line of the "TO" and "FROM" column shift matrices 37, 38 with the ten registers being coupled to the tenth to nineteenth accumulator positions respectively. The tenth accumulator position may now be used because it is cleared of its multiplier digit once the multiplier digit is entered into the special delay chain 146.

Systems in accordance with the invention do not utilize continuous shifting or accumulation of values in the time domain, inasmuch as this would result in unequal multiplication speeds for different multiplicand digits. For example, assume that the value 19 is to be multiplied in parallel by 2. For the tens order digit (1) only two time increments are needed, whereas the higher-numbered units order digit (9) requires at least eighteen time increments. It is difficult to transfer carry information between orders in which products are accumulated at widely varying speeds. Problems of this nature are obviated, in accordance with the invention, by the use of idling as well as time shifting phases during multiplication.

Prior to describing the sequence of idling and time shift phases, however, there should be an understanding of the manner in which multiplicand digits are shifted in time in accordance with multiplier digits. For this, reference should be made to FIGS. 5, 6 and 8 particularly. Multiplicand digits set into the delay chains 40 in the registers 31 of FIG. 5 are coupled individually to the available accumulator positions by the designated couplings through the "FROM" and "TO" column shift matrices. In a single multiplication step, the multiplicand value is merely added to itself once, and the resulting data pulse is thereafter recirculated in the delay unit 100 in the accumulators (FIG. 6). Thus, under control of the multiplication control unit of FIG. 8, an odd zero, or multiply start, pulse provided through the "OR" circuit 118 and the "FROM" column shift matrix to the "OR" circuit 89 in the first stage of the registers 31 is applied to the delay chain 40, which is set to provide an incremental delay corresponding to a multiplicand digit. The pulse is then shifted in the time domain from zero-time by the desired number of unit-times, and is then provided as an output signal through the "AND" gate 86 and the "OR" circuit 87 to the "TO" column shift matrix for return to the accumulator of FIG. 6. In the accumulator, the value is entered into the delay circuit 100 for subsequent recirculation, through the "OR" circuit 97 and the sync "AND" gate 102 which is coupled to the input of the delay circuit 100. The sync "AND" gate is activated by input signals from the reset "AND" gate 104, which is controlled primarily by clock pulses which insure that the pulse applied to the delay line 100 are properly in synchronism with the master clock. The reset "AND" gate 105 is employed only in conjunction with positions 1 through 10 in the accumulator, the remaining input signal to this gate 104 being derived from circuits which are employed only in conjunction with entry of the multiplier digits and the special delay chain 150.

To insure proper cycling of the various digital values, together with concurrent adjustment for carries between different orders of magnitude, the system uses idle phases which may best be described in conjunction with FIG. 10. FIG. 10 represents a timing chart of all possible conditions at the output tap of the accumulator loop during multiplication. The chart illustrates the manner in which interspersed idle phases are used with each of the nine possible multiplicand pulse trains. A maximum number of seventeen total cycles may be employed, with a multiplier digit of 9. Only one of the nine pulse trains shown can exist, of course, in one accumulator loop during any one multiplication.

In FIG. 10, the odd or unshaded cycle representations represent the successive multiples (first through ninth) of each multiplicand digit. The intermediate even (shaded) cycles represent what may be termed "carry-detect" cycles. The *absence* of a pulse during a carry-detect cycle interval indicates that a carry is to be provided to the succeeding stage. The term "cycle" is used to designate a ten unit-time interval, rather than the circulation of the data pulses around the various loops which are used. The idle phase requires a full ten unit-times, but is to be distinguished from the odd and even cycles, which always start at zero-time.

Development of the product values utilizes the interspersed idle phases in such a fashion that each multiplicand develops a given multiple in the same number of intervals, or total fixed data intervals, as is required for each other multiplicand. Thus, to develop the ninth multiple of a multiplicand of 1, requires the same total number of operating cycles as when the multiplicand is 2, 3 or any other decimal digit. Carries are developed at appropriate points in the generation of the product, making parallel multiplication of the values readily achievable.

The following general rules may be stated as a summary for the manner in which the various multiplicands are manipulated:

(1) During the first cycle the data pulses are shifted in time in accordance with the multiplicand digit, or (stated in another way) the delay is increased.

(2) The time domain representation is then recirculated to the accumulator and delayed a full interval with delay for carry being added.

(3) In the second and all other even cycles, the pulse is shifted in the time domain in an amount corresponding to the multiplicand value. In each case, the data pulse returned from a register is then subjected to a further ten unit-time delay.

However, the presence or absence of an output pulse during these cycles determines whether or not a carry indication will be provided and whether or not the succeeding phase will include an idle. For this, the following subrules are applicable:

(a) If a pulse is identified during the even cycle, the next succeeding cycle utilizes an idle phase but no carry signal is provided.

(b) If no pulse is identified during the even cycle, a carry is to be indicated but no idle is to be used.

This use of the interspersed idle maintains proper parallelism between the different products as they are developed from the multiplicands. A better appreciation of this may be had by reference to FIG. 10, in which successive multiples of each multiplicand appear from 1 through 9. For the uppermost pulse train, or a multiplicand of 1, the pulses in the first cycle are immediately shifted one position in the time domain (to what may be termed 1-time) and the pulses for all the other representations are correspondingly shifted one cycle place higher. No carry signal will be provided, because this is equivalent to multiplication by one. The data pulses are then delayed a full ten unit-times and returned to the registers for further shifting. In the second cycle the multiplicand digit "1" is again time shifted by one place to appear at 2-time. Now rule 3(a) applies, to denote that a further idle phase should be used, but that no carry is to be indicated. Therefore, the pulse is idled into the third cycle, where it again appears at 2-time. Going into the fourth cycle again, there is a full ten unit-time delay and an additional one unit-time delay, so that the pulse appears at 3-time. This pattern is repeated to the seventeenth cycle, without any carries being indicated, until the multiplicand digit is finally correctly placed at 9-time in the ninth odd cycle.

With a multiplicand value of 2, successive multiples are developed in similar fashion, with a carry being appropriately indicated at the proper time. The sequence is substantially the same as for the multiplicand of 1, except for the advance by two digital places during each shifting sequence, so that in the seventh cycle, which is the fourth odd cycle, the data pulse is properly located at 8-time. In the next following, or fourth even cycle, however, the increase in delay results in the absence of a pulse, so that a carry is indicated along with the pulse which appears at zero time in the next succeeding cycle. The next circulation of the data pulse also results in its being increased in delay into the next cycle.

With a multiplicand of 9, a carry is provided during each even cycle for a total of eight carries through the seventeen cycles. The idle phase is never used alone when the multiplicand is the digit 9.

The mechanism for carrying out these functions is contained principally within the accumulator positions illustrated in FIG. 6. Note the idling loop which is provided from the delay circuit 100 through the "AND" gate 109, the "OR" circuit 113 and the "AND" gate 115 back through the "OR" circuit 97 and the "AND" gate 102 to the input terminal of the delay circuit 100. Whenever the carry detect flip-flop 117 is in its "transferred" state and the carry flip-flop 108 is in its "normal" state output signals from the ten unit delay circuit 100 pass through the activated "AND" gates 109 and 116 and the associated circuitry back to the input terminal of the delay circuit 100. The carry detect flip-flop 117 is set by output signals from the sync gate 102, into the "transferred" state, thus insuring that the chain bypass line will be used to provide an idle phase except where the even zero pulses intervene to reset the flip-flop 117 so as to pass the circulating data pulses through the "AND" gate 115 to the variable delay chain for shifting in the time domain in accordance with the multiplicand value.

A comparison of the functioning of the carry detect flip-flop 117 with the sequences illustrated in FIG. 10 shows that the data pulses are properly shifted in accordance with FIG. 10. With a multiplicand of 1, for example, a data pulse is time-shifted during each odd cycle, and idled during each even cycle for the successive multipliers which are used. In each odd cycle, the pulse which is derived back from the variable delay chain through the "TO" matrix and which is applied to the input terminal of the ten unit delay circuit 100 also sets the carry detect flip-flop 117 into the "transferred" state. The even zero pulse provided at the start of the second and remaining even cycles resets the carry detect flip-flop 117, however, to the "normal" state so that after the ten unit-time of delay the "AND" gate 115 has been activated to return pulses to the variable delay chain in the registers through the "OR" circuit 118 and the "FROM" column shift matrix. Thus the additional unit of delay is added after circulation through the ten unit-time delay circuit 100 and the returning pulse which is applied through the sync gate 102 again sets the carry detect flip-flop 117 while concurrently being applied to the ten unit delay circuit 100.

In the third cycle, therefore, as the output pulses are derived from the ten unit delay circuit 100, the pulse is diverted through the chain bypass line because the "AND" gate 116 is activated to complete the loop. Similar sequences transpire for each of the remaining multiplier places.

Similar advancing and idling phases are employed during the successive cycles with a multiplicand of 2 until the eighth, or fourth even cycle is encountered. No pulse appears during the eighth cycle, and the carry is generated in a manner described below. The carry detect flip-flop 117 remains in its "normal" state as a result of the even zero pulse provided at the start of the eighth cycle, until the pulse which is provided at zero time in the start of the fifth odd cycle. It will be recalled that rule 3(a) above specifies that the absence of a pulse during the even cycle requires a carry, but no idle phase. In other words, the time domain representation must be shifted during the succeeding cycle. This is accomplished because the even zero pulse is applied to reset the carry detect flip-flop 117 into the normal state just prior to the arrival of the output pulse from the ten unit delay circuit 100, causing the data pulse to be passed through the activated "AND" gate 115 to the "FROM" column shift matrix and to the variable delay chain of FIG. 5.

Taking the multiplicand value of 9, it can be seen from FIG. 10 that the even zero pulses are interspersed between each of the pulses applied to the ten unit delay circuit 100 and the output signal which is derived from that circuit. Thus the carry detect flip-flop 117 is always reset into the "normal" state, with a 9-valued digit, so that the variable delay chain is used for each multiplier place, and an idle phase is never employed.

During the parallel multiplication, carry signals are generated for application to the next higher order position, and appropriately entered into each position from the next lower order position. The carry detect flip-flop 117 concurrently performs this function, in conjunction with the odd zero pulses as they are applied to the carry "AND" gate 120. If no pulse occurs during the even cycle, in accordance with rule 3(b) above, the carry detect flip-flop 117 will remain in its "normal" state, conditioning the carry "AND" gate 120. The even cycle is immediately followed by the odd zero pulse, which thus provides an output signal from the carry "AND" gate 120 and through the inhibit gate 122, the output signal from which constitutes the carry out signal to the next higher accumulator position. The signals which control the inhibit gate 122 are employed in division and need not be discussed here.

Carry signals are therefore applied to carry flip-flops 108 in each of the accumulator stages concurrently at the start of the odd cycles. Accordingly, inasmuch as a data pulse is always circulated through the ten cycle delay circuit 100 during the odd cycles, the pulse is shifted one place in time by being passed through the "AND" gate 110 and the one unit delay 111 during its passage through the loop. This does not affect the orderly transfer of carries between the successive accumulator positions, because in the event that a carry is required it will be provided subsequent to the next even cycle on the occurrence of the odd zero pulse, and in the usual manner.

Multiplication with a single multiplier digit continues for a number of cycles as determined by the multiplication program unit of FIG. 8. The unit of FIG. 8 also uses time domain data pulses to determine the proper end point of the cycling sequence for the given multiplier digit.

The multiplier digit is first entered into the special delay chain 150, by derivation of the digit on the MP digit bus from the appropriate accumulator position as controlled by the control ring 130. With the column shift networks in CS1 position, the accumulator signal L10 is read out on the common bus through the "AND" gate 151 and entered into the special delay chain 150 through the "AND" gates 152. By this means, a pulse occurring at nine-time would be converted into the 1, 2, 3, 3' code settings of 1111, by which the special delay chain 152 provides nine units of delay. Entry of the pulse through the read MP digit "AND" gate 151 is controlled by the multiply control flip-flop 146, which is set "ON" by multiply start pulses provided at even zero time through an "OR" circuit 148. Thereafter, multiply start pulses are not again provided until the next multiplier digit is to be inserted.

The multiply start pulse is also applied through the "OR" circuit 148 to the ten unit delay circuit 147 which provides an output pulse, after ten units of delay, to reset the multiply control flip-flop 146 and concurrently provides a signal to the special timing loop which operates to identify the end of cycling. During the functioning of the accumulators and the circulation of the data pulses in the successive odd and even cycles, these special timing pulses initiated with the multiply start pulses are circulated in the special timing loop, and a search is made for coincidence with a subsequent even zero pulse. The pulse from the ten cycle delay circuit 147 is entered into a nine unit delay circuit 155 through the "OR" circuit 157 and the sync "AND" gate 159. During this entry, and subsequent recirculation, the data pulse is kept in precise position in the time domain through the use of clock reference pulses provided through the reset "AND" gate 158 to the sync "AND" gate 159.

The output pulse from the nine unit delay circuit 155 is provided to the special delay chain 150 and to a ten unit delay circuit 156 which is coupled serially thereto. The output signal from the ten unit delay circuit 156 is then returned through the "OR" circuit 157 and the sync "AND" gate 159 into the special timing loop for another recirculation. Thus, following the initial multiply start pulse at even zero time, and the full ten units of delay provided in the delay circuit 142 (which places the pulse in coincidence with odd zero time and the start multiplication), pulses are thereafter provided at specific times related to the data cycles. These times are the 9th, 28th, 47th, 66th, 85th, 104th, 123rd, 142nd, and 161st time points in the cycles, with respect to the time of the odd-zero pulse which first entered the special timing loop.

The special timing loop is so arranged that for a given multiplier digit set into the special delay chain 150, an output pulse which has been passed through the nine unit delay circuit 155 and then the special delay chain 150 will be in coincidence with an even zero pulse only and exactly when the proper number of cycles for the multiplier digit have been completed. The simplest example, of course (referring again to FIG. 10), is with a multiplier digit of 1, for which a single cycle is sufficient. The pulse occurring at odd zero time and delayed nine units in the nine unit delay circuit 155 is thus delayed one further unit in the special delay chain 150. With a total delay of ten units, the pulse reappears at the output terminal of the special delay chain 150 in coincidence with the even zero pulse denoting the start of the next cycle. Both pulses actuate the "AND" gate 153 at the output terminal of the special delay chain 150, and thus provide "cycle indicator" pulse which denotes that multiplication with the selected multiplier digit is complete. The output signal from the "AND" gate 153 is returned as a reset pulse to the special delay chain 150, and it is also used for setting of the multiply control flip-flop 146 and to initiate the following multiplication step.

This extremely simple arangement of the special timing loop and the special delay chain provides proper detection of the end of the cycling without use of counters and comparators because the pulses circulating in the special timing loop are complementary to the successively higher multiplier values and when added provide totals of 10, 30, 50 and so forth. Thus, a pulse provided at 9-time adds to a multiplier digit which represents a 1-time value to provide an output pulse at 10-time. Because this is ten units later than the initiating odd zero pulse, it constitutes an even zero pulse and appropriately indicates the end of cycling. Similarly, the pulse occuring at the 28th unit time adds to a multiplier digit which represents a delay value of 2-time to provide a pulse coincident with the next even zero pulse. It is significant and necessary that coincidence is not identified except for correct values. Stated in another way, no setting of the special delay chain 150 will result in an output pulse at even zero time except after the proper number of cycles have been completed to effect multiplication with the selected multiplier digit.

It should be noted here that the pulses occurring at 10-time, 30-time and so forth may properly be considered as even zero pulses, because they mark the start of the even cycles.

A separate part of the multiplication program control unit relates to the carry-detect trigger reset which is derived from the "AND" gate 154. Once the multiply control flip-flop 146 is in its "ON" state, each even zero pulse is directed through the "AND" gate 154 to reset the carry-detect triggers in the various accumulator positions.

*Successive multiplication steps.*—Once the cycle indicator pulse has been provided, the output signal from the ten unit delay circuit 147 shifts the control ring 130 to the next position, with a column shift advance pulse from the "AND" gate 133. The data pulse from the next highest accumulator position is then fed to the MP digit bus and applied to the "AND" gate 151 for entry into the special delay chain 150.

As the second multiplier digit is set in the special delay chain 150, the control ring 130 is shifted so that the matrices couple to the ninth to eighteen accumulator positions respectively. The digit read out of the ninth accumulator position is then selectively erased from the delay loop by deactivating the sync "AND" gate 102 (FIG. 6) for a full ten unit cycle. The column shift signal for the ninth accumulator position and the shift control trigger signal activate "AND" gate 127 to provide inhibition of an inhibit gate 126 which is used for conditioning the reset "AND" gate 104. The shift control signal may be taken from the "ON" side of the multiply control flip-flop 146, which is active for a full data cycle at the start of each new multiplication step. Thus, the sync "AND" gate 102 is concurrently deactivated and pulses contained within the delay loop are eliminated. This progressive clearing of the delay loops proceeds from accumulator position to accumulator position at the completion of the separate multiplication cycle. Note that the active column shift order (CS1, etc.) is coupled to the complementary (on ten) accumulator order, by the designation C.S.n.

Partial products are properly accumulated and added in the successive accumulator positions because after the start, the data pulses themselves which are circulating in the accumulator positions are used for subsequent time shifting at the "OR" circuit 118. With the highest order product digit stored in the nineteeth accumulator position, for example, referring again to FIG. 6, when multiplication begins with the next lower order multiplier digit the highest accumulator position is disconnected from the heretofore associated register, and the resultant pulse value continues to circulate in its proper unit time. It may of course be shifted one unit of time if a carry is provided from the next lower order stage. When the new multiplier digit is set in and the carry-detect flip-flop 117 receives a gated even zero pulse the time-shift begins anew. The digital values therefore continuously accumulate but in proper relation for the partial products to develop. The data pulses are constantly referenced to clock pulses for the corresponding digital positions through the operation of the reset "AND" gate 104 and the sync "AND" gate 102. The twentieth accumulator position is of course utilized for accumulation of carries in the highest order position.

The multiplication proceeds in this manner, with the column shift networks successively coupling the registers to different sets of ten of the accumulators, with multiplier digits being successively erased as new column shift couplings are made, and with new multiplier digits being entered into the special delay chain in sequence, as each previous multiplication is completed, until all ten multiplier digits have been employed. At this point the final nineteen or twenty digit product has been accumulated in the accumulator positions. The system is prepared for read out upon the cycle indicator pulse provided from the "AND" gate 153 (FIG. 8) with the control ring 130 (FIG. 6) energizing line CS10. At this point in time the read out "AND" gate 105 (FIG. 6) is fully activated by the provision of the signal on the read bus and a read out signal which is maintained for one cycle upon the final shifting of the control ring. Thus the "AND" gate 106 which is coupled to receive the inputs which are applied to the ten unit delay circuit 100 receives one pulse, at the proper digit time for the corresponding accumulator position, to activate the individual magnet control for the output punch which here constitutes the output device 25 (FIG. 1). It may be desired to continue cycling the data until a convenient readout time, as determined by a signal on the write bus. For this purpose the carry select triggers may be forced off and the carry detect triggers forced on at completion of the final cycle. The system then continues to circulate the data, without further incrementing. The signal on the read bus again insures synchronization of the high speed data pulses with the slower read pulse rate. Because the pulses are provided in time domain representation, however, the read pulses may be coupled to directly control the activation of a punch magnet as the card is successively stepped past the punch station, to indicate the various output digits.

DIVISION

Figure 9:
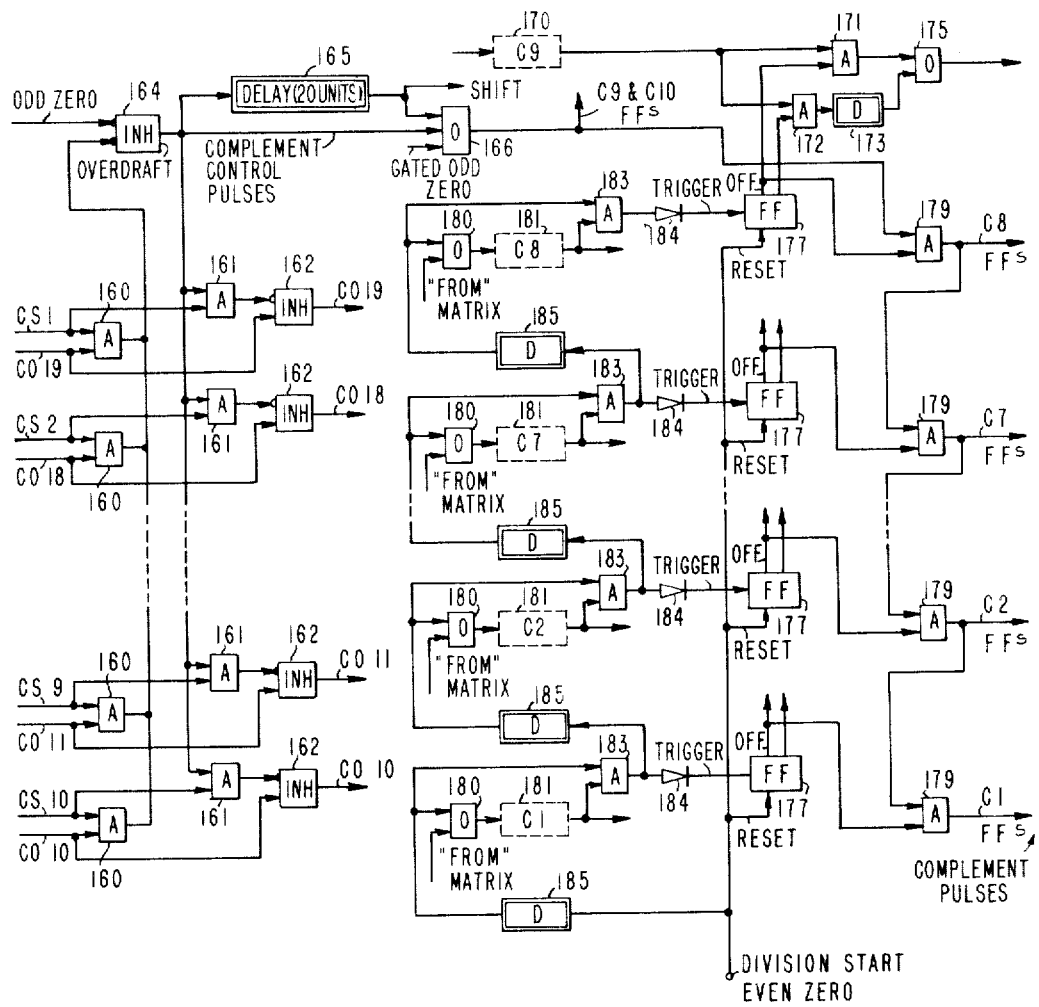
FIG. 9 is a logic diagram of a division program control unit for the arrangement of FIG. 1.

In division, the registers 31 of FIG. 5 and the accumulators of FIG. 6 are again employed, but in conjunction with the division program control unit of FIG. 9. Division is accomplished by repeated subtraction, but quotient cycles are not counted in a preset counter system. Instead the quotient is derived in a novel manner by carrying in the accumulator positions, and by overdraft detection and correction sequences.

Certain details should be noted as to system organization and integration. The variable delay chains represented as dotted line rectangles 181 in FIG. 9 correspond to the delay chains 40 in the registers 31 of FIG. 5. Accordingly, comparing the C1 delay chain 181 in FIG. 9 with the first stage delay chain 40 in FIG. 5, certain of the elements in the zero-sensing ring will be seen to correspond to the gating and other elements associated with the first stage delay chain, namely, the one unit delay elements 88 and 185, the "OR" circuits 89 and 180 and the "AND" gates 91 and 183 represent the same circuit units in the different accumulator positions. These parts of the system are duplicated in the various figures for ease of reference and to show the integrated organization of the different parts.

In like manner, the "AND" gates 160, 161 in the overdraft detection circuits of FIG. 9 corresponds to the "AND" gates 123, 124 in the overdraft and carry signal portions of the accumulators illustrated in FIG. 9. The inhibit gate 164 of FIG. 9 is not represented in FIG. 6.

The division program control unit therefore consists principally of the overdraft detection circuits, zero sensing and complementing circuits, together with the control ring 130 of the multiplication program control. Carry signals and overdraft signals are provided by the "AND" gates 160, 161, in combination with the inhibit gates 162, 164. Certain shift functions, described below, are carried out by the 20 unit delay circuit 165 and the coupled "OR" circuit 166. The lowest eight accumulator positions control individual ones of a group of flip-flops 177 and "AND" gates 179 which are used for zero sensing and complementing. In the ninth position, which will always have a digital value other than zero with proper operation, the carry control "AND" gates 171, 172, the one unit delay circuit 173 and the output "OR" circuit 175 are shown explicitly. Note that the flip-flops 177 and the "AND" gates 179 of FIG. 9 correspond to the elements 85 and 93 respectively at the individual positions, as shown in FIG. 5.

*Zero sensing and complementing.*—The use of the 1, 2, 3, 3′ code and the arrangement of the registers permits ready conversion of the divisor values to the corresponding tens complement values. The divisor is read during data input into the successive register positions, starting with the high digit in the ninth accumulator position. No digit is placed in the high order position of the accumulators to allow space for a possible quotient digit. Referring now to FIGS. 2 and 5, the flip-flops 44 (FIG. 2)

which receive the binary-valued signals in the 1, 2, 3, 3' code may, as previously discussed, be triggered to their opposite states to provide the nines complement directly. This is accomplished, in FIG. 5, by actuation of the flip-flop 85 which conditions the complement "AND" gate 93 so that when a complement signal is derived the flip-flops 44 are shifted to their opposite states.

In order to provide the tens complement from the nines complemented digits, it is necessary to add a single unit of delay in the register position in which is contained the lowest order decimal digit of the divisor. With the high order divisor digit in the ninth order or position, the least significant digit may be at this or any of the lower positions. A digit must be present in the ninth position, for otherwise the divisor would be all zeros. Through use of a zero sensing means, the least significant divisor digit is located, and the signals from the ring connection set the flip-flop 85 to condition the "AND" gate 94 which selectively couples the output signal from the delay chain 40 into the additional single unit delay circuit 96. This is done prior to the return of the data pulse to the "TO" column shift matrix, thus effectively adding a single unit of delay to the data. This complexity is necessary because the register, unlike the accumulator, has no tens transmission.

The maximum low zero sensing means within the division program unit of FIG. 9 comprises the ring of flip-flops 177 and associated "AND" gates 179 which are successively tested in a controlled sequence following the division start pulse. The settings of the various register positions are tested in sequence, starting with the lowest order first. The division start pulse provided at even zero time is delayed one digit time by the one unit delay circuit 185 at the first position. Because these circuits 185 are effectively coupled in sequence between the different registers a succession of pulses, each delayed one digit-time, is passed along the line of registers 181 from C1 to C8. Within each position, the output signal from the one unit delay circuit 185 tests the setting of the register. This is done by applying the signal concurrently to the register position 181 through the associated "OR" circuit 180 and to an "AND" gate 183 to which the output terminal of the register position 181 is also coupled. Thus if the C1 register position 181, representing the lowest order digit position, is set for a zero, the output signal will be provided without delay in the register position to the "AND" gate 183, and an output signal will be provided to the succeeding test stage and also to the associated flip-flops 177.

The division start pulse initially resets the flip-flops 177 so that each is "OFF," to indicate the presence of a significant digit other than zero. If a zero is present at that position, the pulse from the "AND" gate 183 is used to trigger the flip-flop 177 in order to reverse its state.

As each successive zero test is made of the registers 181, therefore, the sensing of a zero is caused to turn the associated flip-flop "ON" until a digit other than zero is encountered. The flip-flops 177 at this and all higher positions are left "OFF" because the sensing pulse does not pass the "AND" gate 183, and the zero-sensing sequence is terminated. An output from the highest order "AND" gate 183 can be used to disable division start, since a zero divisor would be indicated. Location of the lowest order significant digit is thus completed within a single data cycle starting with even zero start time.

For entry of the nines complement, a pulse at the gated odd zero time (the first add zero following division start), passes through the "OR" circuit 166 to the various "AND" gates 179; starting with the highest order position in the zero testing ring first. Complement pulses are provided from the series of activated "AND" gates 179, down to the lowest order position having a significant digit.

For tens complementing, interconnections between the flip-flops 177 of the zero-testing ring are used to control the addition of a unit of delay at each register position. This may be seen in FIG. 5, where the first position is shown in detail. Here, if the flip-flop 85 (corresponding to 177 of FIG. 9) is "OFF," the "AND" gate 94 is conditioned, so that a carry is added to the data pulse. In all other positions, the "AND" gates 94, 86 are also controlled by the output of the flip-flop in the next lower order. These three input "AND" gate arrangements are required to insure that a carry is added only at the location of the least significant digit in the divisor.

Upon completion of the operation of the zero testing means, therefore, each of the significant digits of the divisor has been set to its individual nines complement, and the lowest order significant digit has also been set to add a carry, so that the entire value is the tens complement of the original divisor value. The zeros in the lower order positions, if any exist, are not complemented or set to add a carry, this being prevented by the operation of the zero testing means and the circuit intercouplings.

*Repeated subtraction and overdraft correction.*—The division operation fundamentally consists of repeated subtractions of the divisor from the dividend. In any such subtraction process, the number of subtractions which is needed in bringing the dividend to zero determines the quotient value. In the present system, as will be described in greater detail below, successive values which constitute the quotient are accumulated in the appropriate accumulator positions as shown in FIG. 6, under control of the division program control unit of FIG. 9. The divisor is read into the registers, with the high order digit in the ninth position and a zero in the tenth position. The dividend is read into the accumulator positions, with the high order digit in the eighteenth position and a zero in the nineteenth position. The quotient is developed in the tenth through nineteenth positions of the accumulator.

For subtraction, the values of the divisor are complemented, so that as between individual digits additions may be made as previously described in conjunction with multiplication. A fundamental difference, however, is that subtraction must be repeated for an initially unknown number of cycles, as determined by the ultimate quotient value. In systems in accordance with the invention, determination of quotient digit values is made by the detection and correction of overdrafts. Overdraft occurs whenever the remainder becomes negative (less than zero) by too many reductions by the divisor. With complemented values, the overdraft condition exists when the sum of the complemented divisor and that part of the dividend to which it is being added is less than is needed to provide a carry from the high order position. As a very simple example, assume that the value 5 is to be divided by a divisor 4. The tens complement of 4 is the value 6, and the result of addition of 5 to the complement 6 is one plus a carry. In the next subtraction step the partial remainder (1) is added to complement 6 to provide the value 7, without a carry. Thus the second subtraction step revealed an overdraft condition, indicating a high order digit for the quotient of 1.

One example of overdraft detection and control systems in accordance with the invention is provided by the groupings of "AND" gates 160, 161 and the inhibit gates 162 on the division program control unit of FIG. 9. When utilizing multi-digit dividends and divisors and starting with the high order digits, carries and overdrafts are determined relative to the highest order digit positions which are then being used. All non-significant digits are suppressed during this sequencing, as previously described in conjunction with the zero-testing ring. The column shift network is caused to shift the position of the most significant digit involved in the division as each overdraft is identified after the necessary number of subtractions at a given position.

The overdraft detection circuits in FIG. 9 provide the desired carry and overdraft signals and the needed control functions in particularly simple fashion. Two principal operating conditions are to be distinguished during the repeated subtraction cycles, the first condition being that in which a carry-out signal is provided from the highest order active position, and the other condition being that of overdraft, in which no carry-out signal is provided. The carry will be generated during an even cycle (see FIG. 10) and thus will precede an odd zero pulse which is applied to the overdraft inhibit gate 164. This inhibit gate 164 is coupled to be inhibited by an output signal from any of the series of "AND" gates 160. The "AND" gates 160, however, are each coupled to receive a different combination of column shift and carry-out signals, and together they sequentially locate and shift the highest active digital position in the group of accumulators. For example, a first of these "AND" gates 160 is coupled to receive the CS1 and the CO19 signals, signifying the carry-out from the nineteenth accumulator position when the column shift matrix is in the CS1 state. In the first repeated subtraction cycle, only the CO19 signal indicates an overdraft. Thus only this one "AND" gate 160 is active to inhibit the odd zero pulse at the gate 164 whenever a carry is present in the active accumulator position. When the subtractions have been carried to overdraft, the CO19 signal is absent at odd zero time, and the output signal from the inhibit gate 164 becomes the complement control pulse, which denotes overdraft at this time. Thereafter a correction cycle is begun and the column shift network is set to shift the divisor by one place and to make the next accumulator position active.

When the overdraft has been detected there is no carry-out signal at the "AND" gate 160 which is conditioned by the column shift signal. Nonetheless, it is necessary to insure that no erroneous carry signals are provided in the active order during the ensuing correcting cycle. For this reason, the complement control pulses are applied to "AND" gates 161 which are coupled to receive the different column shift signals. Only that "AND" gate 161 which is also energized by a column shift signal provides a signal to inhibit the operation of the coupled inhibit gate 162, thus suppressing carry-out during correction cycles which follow the detection of an overdraft.

The complement control pulses passed by the overdraft inhibit gate 164 perform two other functions in addition to the suppression of carry-out during correction cycles. When applied through the "OR" circuit 166, the complement control pulses immediately pass the "AND" gates 179 to appear as complement pulses for inverting the series of flip-flops C8, C7, etc., down to the least significant divisor position as determined by the zero test network previously described. The highest order flip-flops, C9 and C10, are directly inverted in state by this pulse.

During a correction interval of twenty unit delay circuit 165 to which the complement control pulses are also applied, the registers are held in their original settings, and the true divisor is added to the dividend. The delayed signal from the twenty unit delay circuit 165 is then applied to the chain of "AND" gates 179, to again invert the state of the flip-flops, C10, C9, C8, etc., and to return them to the complemented values. Concurrently, the output signal from the twenty unit delay circuit 165 is provided as a shift pulse to move the column shift matrices to their next active states. This permits the repeated subtractions to begins again with the divisor in the next position.

*Complete division example.*—A detailed example of the division operation may now be given with reference to FIG. 11, utilizing a dividend value of 41778 and a divisor of 45, and proceeding through the division to give the quotient of 928.4. The left hand column in FIG. 11 represents the successive individual steps in the division, and the decimal digits which are shown are those contained in the indicated positions of the register and the accumulator at these various operative steps. To insure uniformity and to prevent erroneous carryovers, the highest order digit of each of the dividend and divisor are inserted as zeros. The remaining positions of the registers and accumulators, not illustrated as having specific values, are provided with zero digital values.

In the read-in-phase, the digital value 045 is read into the registers, with the high order digit in the tenth position, and the 041778 value is read into the accumulator, with the high order digit being in the nineteenth position. Thereafter, referring now to FIG. 9, on the provision of a division start even zero pulse, and continuing for no more than eight unit-times, the chain of flip-flops 177 "AND" gates 179 are operated in the zero-test sequence in accordance with the settings of the delay chains in the registers 181. The read-in phase is completed prior to the application of the following gated zero pulse to the "OR" circuit 166, and the generation of the C9 and C10 complement pulses, and the gating of the C8, etc. complement pulses through the "AND" gates 179. The tens complement of the divisor is thus set into the registers C10, C9, C8, etc. Accordingly, the 045 value read into the registers is complemented to its nines complement, or 954. Because of the couplings between the different stages, the lowest order digit is increased by 1, providing the tens complement in the next step of 955.

With the tens complement set into the delay chains in the various active register positions of FIG. 5, and the column shift matrices in the CS1 position, the system is enabled to add the complemented division values represented by the register settings to the appropriate accumulator positions. Because only three digit places are used in the divisor, only three are used in the dividend, with the subtraction proceeding from high order digits first. The remaining digital places in the dividend are carried forward straightforwardly until such time as the divisor is shifted into proper relation with them. The addition of the complemented dividend values to the accumulator values is accomplished directly in accordance with the previous discussion of a multiplication step. Carry signals are provided at odd zero-times. Thus the tens complement 955 is added to the value 041 of the dividend, to produce 966, without a carry at the high order position. This condition is detected at the overdraft detection circuits of FIGS. 6 and 9. As shown in the accumulator of FIG. 6, a carry signal, when it exists, is passed through the "AND" gate 120 at odd zero time, and provided to the "AND" gate 124 and the inhibit gate 122. In FIG. 9, the carry signals are passed by the corresponding inhibit gates 162 at odd zero time at each position. When there is overdraft, however, the carry does not exist at the odd zero time at the active order. Accordingly the output of the active "AND" gate 160 does not inhibit the complement control pulse at the inhibit gate 164, so that the overdraft cycle is commenced.

In overdraft, the complement control pulses are first passed through the "AND" gates 179 at the positions containing significant digits as complement pulses for these stages. The associated flip-flops are inverted to provide the nines complement (here 044). Inversion of the active flip-flops directly provides the tens complement, 045, because of the intercoupling in the zero-test ring.

The addition of the divisor value, to correct for the overdraft, then follows during the next twenty unit-times. At the succeeding add zero-time a carryout pulse is provided from the high active order "AND" gate 160, but this is suppressed at the inhibit gate 162. To this end, the column shift signal from the 20 unit delay circuit 165 is provided slightly prior to the odd zero pulse, but subsequent to the completion of addition. No carry from the nineteenth position can therefore pass into the twentieth position. Between the successive odd zero pulses the circulating values in the accumulator positions of FIG. 6 are diverted through the register positions of FIG. 5 and the corrective addition takes place. This sequence returns the divisor to its original value of 045 for an additive cycle, following which the signal from the twenty unit delay circuit 165 returns the values to the tens complement (955) and also institutes column shift.

At the first column shift, the divisor is effectively moved one place to the right relative to the dividend. The eighteenth accumulator position becomes active for quotient storage at this point, and the divisor is again subtracted from the related part of the dividend.

In the series of succeeding additions of the complemented 0955 value in the registers to the 0417 value in the accumulator, each provides a carry at the highest order through nine steps. These successive carry signals are accumulated and stored as the first quotient digit in the nineteenth accumulator position. At the tenth step, there is no carry, so that the overdraft is indicated and the correction cycle is begun. Following the correction cycle, the divisor is recomplemented and shifted one position, and the eighteenth accumulator position becomes active to receive quotient digits. The sequences are repeated, with only the number of subtraction steps varying until the final quotient value of 928.4 is accumulated and stored.

It should particularly be appreciated that a division operation is carried out using essentially the same elements as those employed in the multiplication. Through the employment of the time domain techniques, the same accumulator positions which are utilized for the reception of dividend values may also be employed for the development of quotient digits and ultimate totals in orderly fashion. Again, the readout from the system is the same as previously described in conjunction with mutliplication.

SUMMARY

Systems in accordance with the invention can therefore provide complete calculating and data processing functions using pulse representations of data in the time domain. System configurations are based upon the use of extremely simple, standard delay elements. These delay elements are untapped units which provide selected fixed increments of delay, with a maximum of three different increments being required for decimal digits. Additionally, the data pulses can be shifted by variable time increments with excellent economy by delay chain circuits in accordance with the invention. Using the particular four digit coding provided as a feature of the invention, only four bistable elements are utilized in effecting ten different unit-time shifts. These arrangements make feasible the use of single delay loops to store decimal digits. In conjunction with these delay loops, only very few active circuit elements are required for pulse shaping and timing purposes.

The elemental arithmetic operations of addition, subtraction, multiplication and division are carried out by the same unique combination of delay loop and variable delay chain. The delay chain is so arranged that stored data may readily be complemented for use in subtraction and division sequences. By proper intercoupling of the registers and the accumulators which represent the chains and loops in multi-position systems, and through the use of unique matrices in accordance with the invention, the registers may be coupled to the accumulators in successively varying sequences. Through these couplings, data pulses are repeatedly shifted in the time domain with positional variations for multiplication and division with multi-digit operands. Considerable speed with great simplicity becomes feasible through parallel multiplication of a selected number of digits.

Both the multiplication and division control units utilize time domain sequencing and are likewise unique. By means of a special delay chain and a special timing loop, the multiplication control unit permits determination of the desired number of addition cycles without the need for special registers or counters. The division program control unit eliminates the need for registers to maintain the quotient, inasmuch as the quotient digits are accumulated in accumulator positions and unique overdraft and correction cycles are used in conjunction with repeated subtractions to derive the quotient value.

These basic arithmetic operating circuits and elements are further enhanced by unique input and output arrangements by which input data may be converted into a code suitable for operation in the time domain, and the time domain representations may be used directly, if desired, to actuate output mechanisms. In addition, the control circuitry includes means for synchronizing the high speed data pulses with the more slowly derived rates of the input and output mechanisms.

I claim:

1. A calculating system comprising means responsive to digital input data for representing a part of the data by time-distributed pulses within timed cycles,
   the means including a number of different positions each responsive to a different position of the digital input data,
   means responsive to a remaining part of the input data and including a number of positions for shifting the pulses in the time domain in at least a single cycle, and
   means coupling successive ones of the positions for providing carries between the positions.

2. A digital data processing system including the combination of means for providing operands,
   first means responsive to the operands for providing data pulses having selected time delays relative to the cyclic reference points,
   delay loop means coupled to circulate the data pulses,
   second means responsive to the operands for providing data representations in a binary code,
   variable delay means coupled to be controlled by the second means, and
   control means for successively cycling data pulses in controlled sequences between the delay loop means and the variable delay means.

3. A digital data processing system including the combination of means for providing operands,
   first means responsive to the operands for providing data pulses occupying representative incremental delay positions relative to predetermined data cycles,
   delay loop means coupled to circulate the data pulses, the delay loop means providing full data cycle delay times,
   second means responsive to the operands for providing data representations in a binary code,
   variable delay means coupled to be controlled by the second means to provide varying increments of delay within a data cycle,
   matrix means for selectively intercoupling the delay loop means with the variable delay means, and
   control means coupled to the matrix means for successively cycling data pulses in controlled sequences between the delay loop means and the variable delay means via the matrix means.

4. In combination, a first delay means settable for delaying signals a period of time corresponding to a first operand,
   a second delay means providing a fixed delay,
   switching means interconnecting the first and second delay means, and
   sequence control means for controlling the switching means in a number of cycles corresponding to a second operand.

5. In combination, a first delay means settable for delaying signals a period of time corresponding to a first operand, the period of time being within a fixed data cycle,
   a second delay means providing a fixed delay corresponding to the fixed data cycle,
   switching means controllably interconnecting the first and second delay means,
   bypass means coupled to the second delay means, and
   sequence control means for controlling the switching means and the bypass means to provide a number of cycles of operation corresponding to a second operand.

6. In combination, a number of first delay means settable for delaying individual signals by intervals of time within an over-all cycle corresponding to digits of a first operand,
- a number of second delay means for providing fixed delay intervals corresponding to an over-all cycle,
- controllable matrix means for selectively intercoupling successive ones of the first delay means with successive ones of the second delay means,
- a number of bypass means, each associated with a different one of the second delay means for selectively bypassing the first delay means in accordance with signal delays within the over-all cycles, and
- means responsive to digits of a second operand for selecting the number of over-all cycles.

7. A digital data processing unit for providing arithmetic operations including, in combination:
- a number of first delay means settable for delaying individual signals by incremental intervals of time within an over-all fixed data cycle, the delay increments corresponding to digits of a first operand,
- a number of second delay means for providing fixed delay intervals corresponding to the fixed data cycle intervals,
- controllable matrix means for selectively intercoupling successive ones of the first delay means with successive ones of the second delay means,
- a number of bypass means, each associated with a different one of the second delay means for selectively bypassing the first delay means in accordance with signal delays within the fixed data cycles,
- controllable means coupled to the first delay means for selectively complementing the incremental interval of delay within the fixed data cycle, and
- control means settable in accordance with an arithmetic operation to be performed and responsive to digits of a second operand for operating the controllable matrix means and the bypass means in successive cycles.

8. A circuit for converting data represented as input pulses having selected unit delays within fixed data cycles into binary data representations, including the combination of:
- clock pulse means providing clock pulses at zero-times in the data cycles,
- delay line means having a plurality of taps, each arranged to provide a pulse at a different unit-delay interval following a clock pulse,
- a group of conductors, each representing a different binary place,
- a group of unilateral conducting elements interconnecting the taps with the conductors to provide binary signal patterns on the conductors representative of the binary code for each signal appearing at a tap, and
- a group of coincidence gates, each of the gates being coupled to a different conductor and each also being coupled to receive the input pulses.

9. A circuit for controllably time shifting input pulses representing decimal values in the time domain in response to input decimal values and comprising:
- four bistable elements, each coupled to respond to a different one of the input decimal values in a 1, 2, 3, 3′ code,
- at lease eight gating circuits,
- four individual delay circuits, each of the delay circuits being associated with a different one of the bistable elements and each having a corresponding one, two or three-valued time delay increment,
- means interconnecting the successive delay circuits in an alternating series relationship with a first group of four of the eight gating circuits, said first group of four gating circuits each being conditioned by a selected state of a different one of the bistable elements, said
- means interconnecting a second group of four of the gating elements to the different delay circuits, each one of the second group of gating circuits being coupled to be controlled by the alternate state of a different one of the bistable elements, and each being coupled to provide a bypass around the associated delay circuit to the next succeeding delay circuit.

10. The invention, as set forth in claim 9, including, in addition:
- a fifth bistable element,
- a fifth delay circuit, the fifth delay circuit providing an additional single time delay increment,
- a pair of gating elements, each coupled to be controlled by a different state of the added bistable element, one of the gating elements being coupled to receive signals from the previous delay circuit and to bypass the added delay circuit, the other of the gating elements being coupled to receive signals from the previous delay circuit and to couple said signals to the added delay circuit, and
- said circuit further including means coupled to the four bistable elements for reversing the states thereof to provide a nines complement value.

11. A system for converting binary-coded decimal data to time domain representations of the decimal data including:
- a group of four bistable elements, each corresponding to a different position in a 1, 2, 3, 3′ binary progression and each responsive to a different binary digit in the binary-coded decimal data,
- a group of four delay line elements, each associated with a different one of the bistable elements and each providing a corresponding 1, 2, 3 or 3′ delay increment and four pairs of gating circuits, each pair being associated with a different one of the bistable elements, and each gating circuit of the pair being responsive to a different state of the bistable elements, the output terminal of one of the gating circuits being coupled to bypass the associated delay line element and the output terminal of the other of the gating circuits being coupled in series with the associated delay line element, the different positions being coupled together in sequence.

12. Variable delay means for providing selected amounts of time shift of input pulses in response to an input digit or the complement thereof, including the combination of:
- a number of delay elements, each providing a selected number of increments of delay,
- a number of bistable elements, each associated with a different one of the delay elements,
- means controlled by the bistable elements for interconnecting selected ones of the delay elements in series and bypassing the remainder, and
- means for reversing the states of the bistable elements to provide complemented values.

13. A system for multiplying two multi-digit numbers comprising in combination:
- multi-position variable delay means, delay means at each position being coupled to provide an incremental delay circuit having a delay interval proportioned to a different selected value representative of a multiplicand digit,
- multi-position fixed delay means,
- matrix means interconnecting selectable positions of the variable delay means with selected positions of the fixed delay means,
- shift control means coupled to control the matrix means in selected sequences, and
- sequence control means responsive to successive multiplier digits for operating the shift control means in progressive steps, with a selected number of cycles at each step as determined by the respective multiplier digit.

14. A system for multiplying two multi-digit decimal numbers comprising in combination:
- multi-position variable delay means responsive to one of the numbers, each position of the variable delay means being set in response to a different one of the digits to provide an incremental delay value representative of the digit within a fixed data cycle,
- multi-position fixed delay means, each providing a delay corresponding to the fixed data cycle controllable matrix means for interconnecting individual selectable positions of the variable delay means with individual selectable positions of the fixed delay means,
- shift control means coupled to control the matrix means in selected sequences for shifting the interconnections between the variable delay means and the fixed delay means,
- a number of variable delay bypass means each being controllable and coupled to recirculate signals to a different one of the fixed delay means,
- sequence control means responsive to successive multiplier digits from the second decimal number, the sequence control means operating the shift control means in progressive steps as the successive multiplier digits are provided, and
- the chain bypass means through a selected number of fixed data cycles as determined by the respective multiplier digit, to provide idle phases and time-shift phases as determined by partial product values.

15. The invention as set forth in claim 14, wherein each of the positions of the multi-position fixed delay means includes in addition;
- carry detect means responsive to the fixed data cycles and the decimal representations circulated in the fixed delay means, and
- carry means coupled to the fixed delay means and coupled to be controlled by the carry detect means from the next lower order position, the carry means providing an additional selectable unit of delay.

16. A system for division of a first multi-digit operand by a second multi-digit operand including the combination of:
- a plurality of variable delay means, each responsive to a different digit of the first operand and providing a selected delay increment in response thereto,
- a plurality of delay loop means, each responsive to a different digit of the second operand and providing storage thereof in the time domain,
- means controllably intercoupling the variable delay means with the delay loop means in successively shifted combinations providing different high order digital values,
- means for complementing the delay increments provided by the variable delay means,
- means controlling the intercoupling means for selected cycling intervals, and
- means for detecting overdraft conditions in the high order digital values, for terminating the cycling intervals.

17. A system for division of a first multi-digit decimal number by a second multi-digit decimal number including the combination of:
- a number of variable delay means, each of the variable delay means providing a different position and each being responsive to a different digit of the first number to provide a selected incremental delay of an input pulse, corresponding to the decimal digit, with respect to a fixed data cycle,
- a plurality of delay loop means, each being coupled to receive a different decimal digit of the second number and providing recirculating storage thereof, each of the delay loop means providing a delay corresponding to a fixed data cycle,
- matrix means controllably intercoupling the variable delay means with the delay loop means, with each of the positions of the variable delay means being coupled to a different one of the positions of the delay loop means, in succession,
- means coupled to the variable delay means for changing the states thereof to provide the tens complement of the first number,
- means coupled to the matrix means for providing a selected number of cycles of circulation of data pulses between the delay loop means the coupled variable delay means, thus to provide repeated subtraction,
- overdraft detection means responsive to data pulses in the delay loop means for terminating the cycling intervals, and
- sequence control means responsive to the overdraft detection means for controlling the matrix means, to provide a shifting of the intercoupling positions, and coupled to the overdraft detection means to provide overdraft indication at a different high order digital value concurrent with the shifting of the intercoupling.

18. The invention as set forth in claim 17 above, including in addition:
- a tens complement network having a number of bistable elements, each corresponding to a different position of the variable delay means,
- a number of carry circuits, each coupled to a different one of the variable delay means,
- a zero sensing circuit coupled to the variable delay means for detecting the lowest order position having a digit other than zero,
- means responsive to the zero sensing means and coupled to the complement network and the carry circuits,
- means responsive to carry indications from the delay loop means and to the position of the matrix means for detection of overdraft during the repeated subtractions.

19. The invention as set forth in claim 18 above, wherein the variable delay means includes:
- a number of individual units of delay disposed in the 1, 2, 3, 3' code, and wherein the complement network provides a nines complement by inversion of the values at each position in the code.

20. A division system comprising:
- means for recirculating individual pulses which represent by incremental delay within a fixed data cycle the value of a first operand,
- means coupled to the recirculating means and responsive to a second operand for repeatedly subtracting the second operand from corresponding positions of the first operand, said subtracting means further time shifting the individual pulses within the fixed data cycle,
- means responsive to the subtraction for detecting overdraft,
- means responsive to the detection of overdraft for sequentially shifting the values being subtracted, and
- means responsive to the detection of overdraft for accumulating a quotient.

21. Control means for a multiplication system, for identifying completion of a selected number of multiplication cycles each denoted by zero-time pulses denoting ten unit-time intervals, including the combination of:
- variable delay means responsive to the selected number of cycles for providing selected intervals of delay within a ten unit-time interval,
- a nine unit-time delay circuit coupled serially with the variable delay means,
- a ten unit-time circuit coupled serially with the nine unit-time delay circuit, and also coupled to provide output signals to the nine unit-time delay circuit; and
- coincidence means responsive to the zero-time pulses and signals from the variable delay means.

22. Control means for identifying the occurrence of a selectable number of cycles, each of which is denoted by a zero-time pulse including:
- variable delay means coupled to receive the zero-time pulses and responsive to the selected number of cycles for providing corresponding integral increments of delay within a cycle,
- fixed delay means providing one integral increment less than a full cycle of delay,
- means serially intercoupling the fixed and variable delay means, and
- means responsive to the variable delay means and the zero-time pulses for identifying the coincidence of pulses therefrom.

23. A system for converting binary data to time domain representations of the data including:
- a group of bistable elements, each having a selected significance in a binary progression and each responsive to a different binary digit in the binary data,
- a group of delay line elements, each associated with a different one of the bistable elements and each providing a delay corresponding in length to the significance in the binary progression of the respective bistable element, and
- a group of selective bypass circuit means, each selectively coupling a different delay line element under the control of its associated bistable element and responsive to a signal from the next previous delay line element for (1) selectively coupling the delay line element in series with the next previous element or (2) selectively bypassing the delay line element.

References Cited by the Examiner
UNITED STATES PATENTS

| | | | |
|---|---|---|---|
| Re. 24,477 | 3/1958 | Bloch | 235—153 |
| 2,429,228 | 10/1947 | Herbst | 235—172 |
| 2,782,305 | 2/1957 | Havens et al. | 235—165 |
| 2,936,116 | 5/1960 | Adamson | 235—165 |
| 2,940,670 | 6/1960 | Kilburn et al. | 235—166 |
| 2,970,766 | 2/1961 | Epstein | 235—165 |
| 3,017,096 | 1/1962 | Chiang | 235—160 |

ROBERT C. BAILEY, *Primary Examiner.*

MALCOLM A. MORRISON, *Examiner.*